US010853991B1

(12) United States Patent
Yan et al.

(10) Patent No.: US 10,853,991 B1
(45) Date of Patent: Dec. 1, 2020

(54) MULTI-LAYERED ARTIFICIAL REALITY CONTROLLER POSE TRACKING ARCHITECTURE HAVING PRIORITIZED MOTION MODELS

(71) Applicant: Facebook Technologies, LLC, Menlo Park, CA (US)

(72) Inventors: Chengyuan Yan, Fremont, CA (US); Oskar Linde, San Carlos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/417,244

(22) Filed: May 20, 2019

(51) Int. Cl.
G06T 19/20 (2011.01)
G06F 3/01 (2006.01)
G06T 15/20 (2011.01)
G02B 27/01 (2006.01)

(52) U.S. Cl.
CPC ............ *G06T 15/20* (2013.01); *G02B 27/017* (2013.01); *G06F 3/011* (2013.01); *G06F 3/017* (2013.01); *G06T 19/20* (2013.01)

(58) Field of Classification Search
None
See application file for complete search history.

(56) References Cited

U.S. PATENT DOCUMENTS

| 9,996,804 B2 | 6/2018 | Bowers et al. |
| 2015/0352437 A1* | 12/2015 | Koseki ................ A63F 13/5255 463/31 |
| 2017/0358139 A1* | 12/2017 | Balan ...................... G06F 3/011 |
| 2020/0051561 A1* | 2/2020 | Lai ........................ A63F 13/355 |

* cited by examiner

*Primary Examiner* — Yanna Wu
(74) *Attorney, Agent, or Firm* — Shumaker & Sieffert, P.A.

(57) ABSTRACT

An artificial reality system is described includes a hand-held controller tracking sub-system having two components, a Field-of-View (FOV) tracker and a non-FOV tracker that applies specialized motion models when one or more of controllers are not trackable within the field of view. In particular, under typical operating conditions, the FOV tracker receives state data for a Head Mounted Display (HMD) and controller state data (velocity, acceleration etc.) of a controller to compute estimated poses for the controller. If the controller is trackable (e.g., within the field of view and not occluded), then the pose as computed by the FOV tracker is used and the non-FOV tracker is bypassed. If the controller is not trackable within the field of view and the controller state data meets activation conditions for one or more corner tracking cases, then the non-FOV tracker applies one or more of specialized motion models to compute a controller pose for the controller.

20 Claims, 16 Drawing Sheets

UNINTERPOLATED PATH ———
INTERPOLATED PATH -------

US 10,853,991 B1

MULTI-LAYERED ARTIFICIAL REALITY CONTROLLER POSE TRACKING ARCHITECTURE HAVING PRIORITIZED MOTION MODELS

TECHNICAL FIELD

This disclosure generally relates to artificial reality systems, such as virtual reality, mixed reality, and/or augmented reality systems, and more particularly, to tracking controllers for artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user may utilize a hand-held controller to interact with applications or interact with the artificial reality system. Aspects of graphical elements within the artificial reality content may be determined based on the position and orientation of the hand-held controller.

SUMMARY

In general, this disclosure describes artificial reality (AR) systems and, more specifically, a controller tracking sub-system for an AR system that includes a head mounted display (HMD), one or more hand-held controllers, and sensors or cameras to determine and track the pose of the one or more hand-held controllers.

A technical problem with conventional AR systems that use sensors or cameras to track the pose of a hand-held controller is that the hand-held controller may leave the field of view (FOV) of the sensors or cameras, or may be within the field of view but occluded by another object such as a hand or other body part of the user, a second hand-held controller, or by other objects in the physical environment. The AR system thus cannot determine an accurate pose for the hand-held controller, which can lead to user dissatisfaction and frustration with the operation of the AR system.

As a technical solution to the aforementioned technical problem, some aspects include a controller tracking sub-system that can determine a pose for a hand-held controller based on image data provided by the sensors or cameras of an AR system when the hand-held controller is trackable within the field of view of the sensors or cameras of the AR system, and can also use other available data and motion models to determine a pose for the hand-held controller when the hand-held controller is not trackable within the field of view of the sensors or cameras, or if the hand-held controller is occluded by another object in the field of view.

For example, the controller tracking sub-system can have two components, a FOV tracking component (also referred to as a constellation tracking component) and a non-FOV tracking component (also referred to as a "corner-case" tracking component) that applies specialized motion models when one or more of the controllers are not readily trackable within the field of view of sensors and cameras of an AR system. In particular, under typical operating conditions, the FOV tracking component receives HMD state data and controller measurement data (velocity, acceleration etc.) to compute image-based controller state data for a hand-held controller. If the hand-held controller is trackable (e.g., within the field of view, not occluded, and not at rest), the image-based controller state data is used to determine the controller pose and the non-FOV tracking component is bypassed. If the hand-held controller is not trackable within the field of view and the hand-held controller measurement data meets activation conditions for one or more tracking corner cases, the non-FOV tracking component applies one or more activated specialized motion models to compute model-based controller state data for one or more of the hand-held controllers. The model-based controller state data is then used to determine the controller pose.

Example corner cases include: controller near the HMD and not attached to the HMD, hand-over-hand not attached, hand-over-hand attached, position of the controller is unreliable, and controller at rest. Each of the corner cases can have activation and deactivation conditions that determine whether a motion model associated with the activation conditions is evaluated. The behavior for a corner case can include a finite state machine (FSM) and a constrained motion model that can be used to determine a model-based controller state for the hand-held controllers. Behaviors for more than one corner case can be activated during a display frame generation cycle. The resulting model-based controller state data resulting from evaluation of the activated model associated with the highest priority behavior can be used to determine the pose for the hand-held controller.

The aspects described above and further aspects described below can provide a technical improvement over conventional artificial reality system implementations, and can provide one or more practical applications, such as enabling an AR system to determine a pose for a hand-held controller in cases where the hand-held controller is not within the field of view of sensors and/or cameras of the AR system, or when a hand-held controller is occluded. The resulting controller pose can be used to provide a more accurate rendering of artificial reality content by the artificial reality system when the controller is not trackable within the field of view of the sensors and/or cameras of the AR system.

In one or more example aspects, an artificial reality system includes an image capture device configured to capture image data representative of a physical environment; a head mounted display (HMD) configured to output artificial reality content; a pose tracker configured to determine, based at least in part on controller state data, a controller pose representing a position and orientation of a hand-held controller, the pose tracker including a non-FOV tracker having a plurality of motion models associated with different motion behaviors for the hand-held controller, each of the plurality of motion models associated with one or more respective activation conditions, wherein the non-FOV tracker is configured to determine the controller state data in accordance with one of the plurality of motion models in response to a determination that the hand-held controller is not trackable within the image data and that the one of the plurality of motion models is activated; and a rendering engine configured to render for display at the HMD the artificial reality content and at least one graphical object in accordance with the controller pose.

In one or more further example aspects, a method includes obtaining, by an image capture device of an artificial reality system including a head mounted display (HMD), image data representative of a physical environment; determining, by a non-FOV tracker of the artificial reality system, controller state data for a hand-held controller in accordance with a motion model of a plurality of motion models associated with different motion behaviors for the hand-held controller, each of the plurality of motion models associated with one or more respective activation conditions, wherein the determining the controller state data in accordance with the motion model is in response to determining that the hand-held controller is not trackable within the image data and that controller measurement data indicative of a motion behavior for the hand-held controller satisfies the one or more activation conditions associated with the motion model; determining, by the artificial reality system, a controller pose representing a position and orientation of the hand-held controller based, at least in part, on the controller state data; and rendering, by the artificial reality system for display at the HMD, artificial reality content and at least one graphical object in accordance with the controller pose.

In one or more additional example aspects, a non-transitory, computer-readable medium comprises instructions that, when executed, cause one or more processors of an artificial reality system to obtain image data representative of a physical environment via an image capture device; determine the controller state data for a hand-held controller in accordance with a motion model of a plurality of motion models associated with different motion behaviors for the hand-held controller, each of the plurality of motion models associated with one or more respective activation conditions, wherein the determination of the controller state data in accordance with the motion model is in response to a determination that the hand-held controller is not trackable within the image data and that controller measurement data indicative of a motion behavior for the hand-held controller satisfies the one or more activation conditions associated with the motion model; determine a controller pose representing a position and orientation of the hand-held controller based, at least in part, on the controller state data; and render for display at the HMD, artificial reality content and at least one graphical object in accordance with the controller pose.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
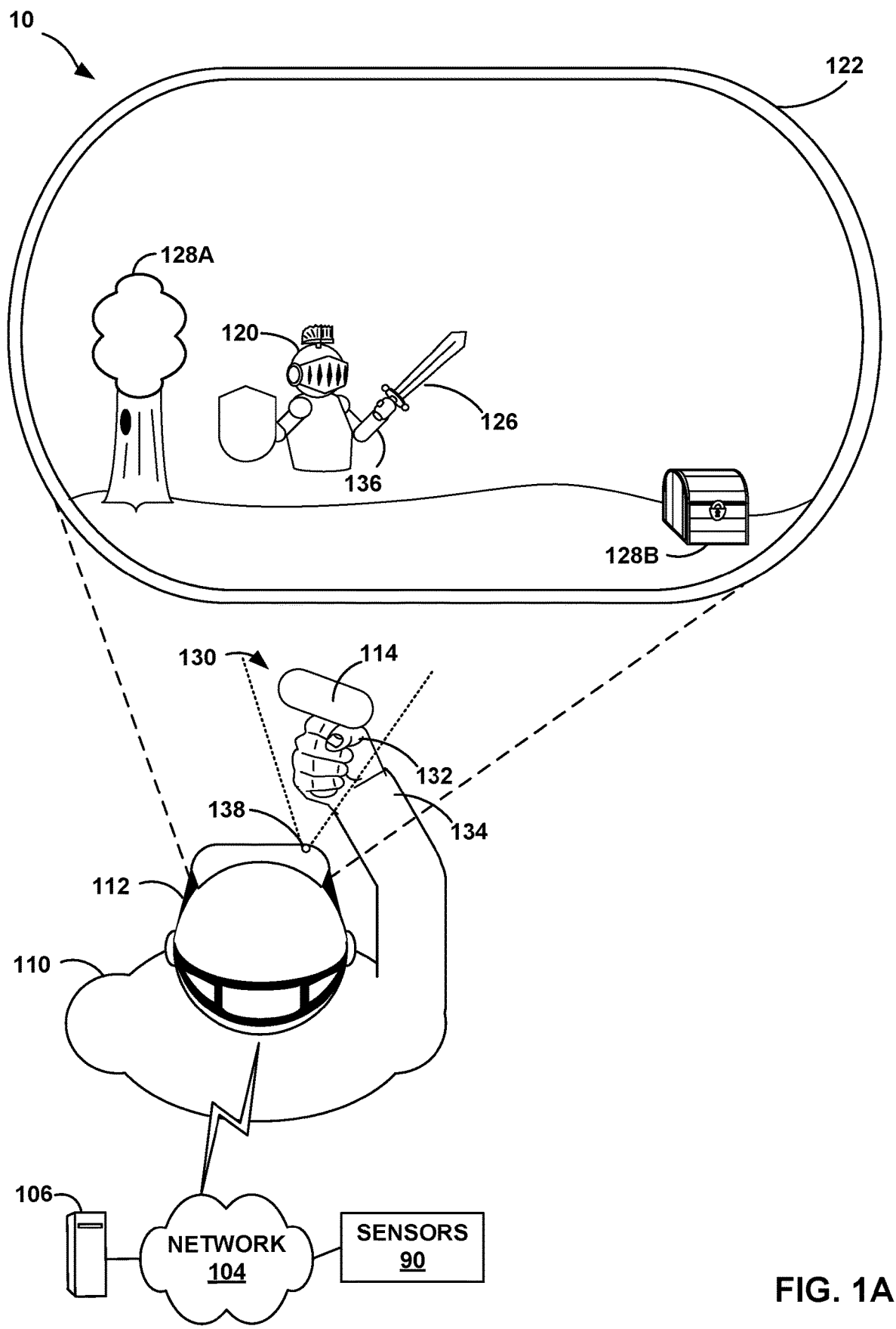
FIG. 1A is an illustration depicting an example artificial reality system that performs pose tracking for one or more hand-held controllers that are not trackable within a field of view of image capture devices of the artificial reality system in accordance with the techniques of the disclosure.

FIG. 1A is an illustration depicting an example artificial reality system 10 that performs pose tracking for one or more hand-held controllers 114 that are not trackable within a field of view of image capture devices of an artificial reality system in accordance with the techniques of the disclosure. In some example implementations, artificial reality system 10 generates and renders graphical elements to a user 110 based on one or more detected poses of one or more hand-held controllers 114 operated by user 110. That is, as described herein, artificial reality system 10 presents one or more graphical elements 126, 136 based on poses of a controller 114 operated by user 110, such as particular motions, configurations, positions, and/or orientations of the controller 114.

In the example of FIG. 1A, artificial reality system 10 includes head mounted device (HMD) 112. As shown, HMD 112 is typically worn by user 110 and includes an electronic display and optical assembly for presenting artificial reality content 122 to user 110. In addition, HMD 112 includes one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment.

In some example implementations HMD 112 operates as a stand-alone, mobile artificial reality system. In other implementations, an artificial reality system 10 can optionally include a console 106 and/or one or more external sensors 90 in addition to, or instead of HMD 112. In the example illustrated in FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on HMD 112 and/or console 106. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by current estimated pose of HMD 112 and current estimated poses for one or more controllers 114, the artificial reality application renders 3D artificial reality content which, in some examples, may be overlaid, at least in part, upon the real-world, 3D physical environment of user 110. During this process, the artificial reality application uses sensed data received from HMD 112 and the one or more controllers 114, such as movement information and user commands, and, in some examples, data from any external sensors 90, such as external cameras, to capture 3D information within the real world, physical environment, such as motion by user 110 and/or motion of the one or more controllers 114. Based on the sensed data, the artificial reality application determines a current pose for the frame of reference of HMD 112, a current pose for the one or more controllers 114 and, in accordance with the current poses of the HMD 112 and controllers 114, renders the artificial reality content 122. In accordance with the techniques of this disclosure, the artificial reality system 10 can determine a pose for the one or more controllers 114 based on data from sensors or cameras of an artificial reality system 10 when the one or more controllers 114 are trackable within the field of view of the sensors or cameras, and artificial reality system 10 can use motion models and available controller measurement data when the one or more controllers 114 are not trackable within the field of view of the sensors or cameras.

More specifically, as further described herein, image capture devices 138 of HMD 112 capture image data representative of objects in the real world, physical environment that are within a field of view 130 of image capture devices 138. These objects can include the one or more controllers 114. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. The virtual hand 136 can be rendered in accordance with a pose of a controller 114 held in hand 132. Further, the artificial reality application can render virtual objects such as virtual sword 126 based on a pose of the one or more controllers 114.

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering graphical elements overlaid on the artificial reality content based on poses determined for a controller 114, regardless of whether or not the controller 114 is trackable within the field of view of sensors and/or cameras of the artificial reality system 10.

Figure 1B:
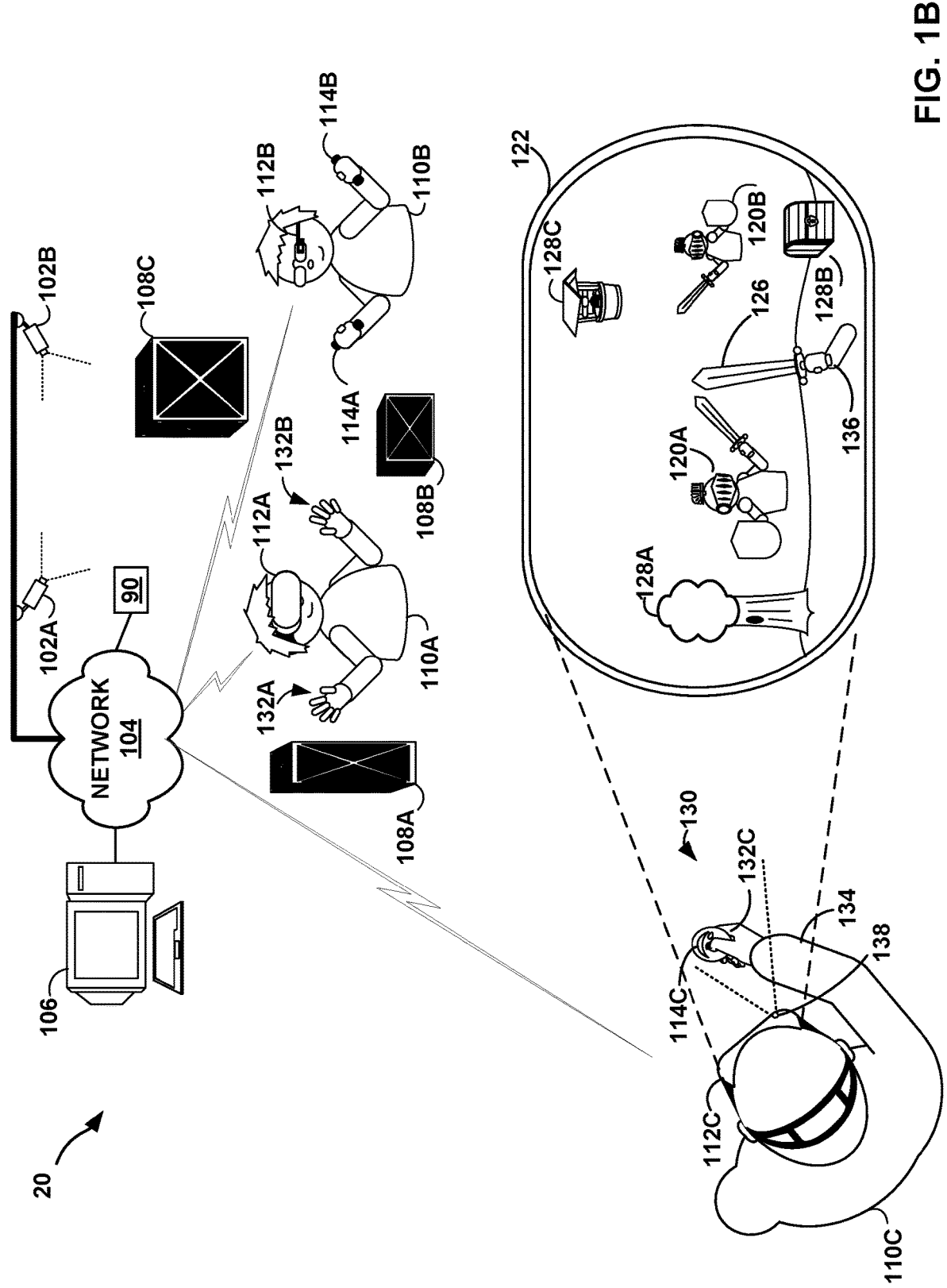
FIG. 1B is an illustration depicting another example artificial reality system that performs pose tracking for one or more hand-held controllers that are not trackable within a field of view of image capture devices of the artificial reality system in accordance with the techniques of the disclosure.

FIG. 1B is an illustration depicting another example artificial reality system 20 that performs pose tracking for one or more hand-held controllers that are not trackable within a field of view of image capture devices of the artificial reality system 20 in accordance with the techniques of the disclosure. Similar to artificial reality system 10 of FIG. 1A, in some examples, artificial reality system 20 of FIG. 1B may present and control graphical elements for user interaction and manipulation within an artificial reality environment based on poses determined for one or more controllers 114.

In the example of FIG. 1B, artificial reality system 20 includes external cameras 102A and 102B (collectively, "external cameras 102"), HMDs 112A-112C (collectively, "HMDs 112"), controllers 114A, 114B and 114C (collectively, "controllers 114"), console 106, and sensors 90. As shown in FIG. 1B, artificial reality system 20 represents a multi-user environment in which an artificial reality application executing on HMDs 112 and/or console 106 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112 and respective controllers 114. Artificial reality system 20 uses data received from cameras 102, HMDs 112, and controllers 114 to capture 3D information within the real world environment, such as motion by users 110 and/or tracking information with respect to controllers 114 for use in computing updated pose information for the controllers 114 within a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 20 renders avatars 120A, 120B based upon the estimated positions for users 110A, 110B, respectively. Further, the artificial reality system 20 can render graphical objects based on the poses of the controllers 114 as determined by the artificial reality system 20.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking controller 114C held by hand 132C of user 110C, and rendering the hand 132C as virtual hand 136 within artificial reality content 122 when a controller 114C held by hand 132C is within field of view 130. HMD 112C may also render virtual objects such as sword 126 based on a determined pose of controller 114C when controller 114C is in the field of view 130. Controller 114C may be in communication with HMD 112C using near-field communication of short-range wireless communication such as Bluetooth, using wired communication links, or using other types of communication links.

HMD 112A and HMD 112B may also operate substantially similar to HMD 112 of FIG. 1A. HMD 112B may receive user inputs from controllers 114A and 144B held by user 110B.

As shown in FIG. 1B, in addition to or alternatively to image data captured via camera 138 of HMD 112C, input data from external cameras 102 may be used to track and detect particular motions, configurations, positions, and/or orientations of controllers 114.

Figure 2:
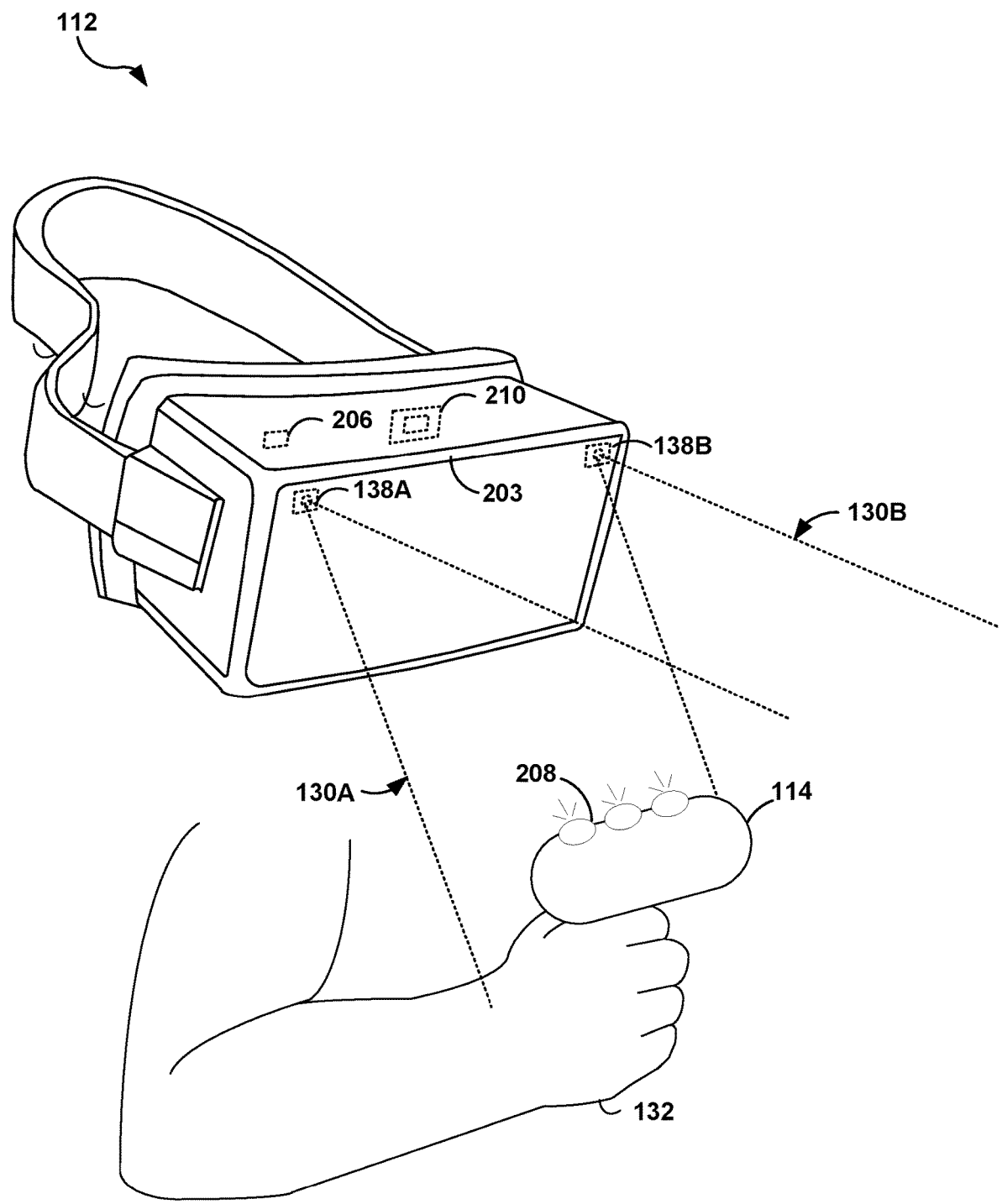
FIG. 2 is an illustration depicting an example HMD that operates in accordance with the techniques of the disclosure.

FIG. 2 is an illustration depicting an example HMD 112 and controller 114 configured to operate in accordance with the techniques of the disclosure. HMD 112 of FIG. 2 may be an example of any of HMDs 112 of FIGS. 1A and 1B. HMD 112 may operate as a stand-alone, mobile artificial realty system configured to implement the techniques described herein or may be part of an artificial reality system, such as artificial reality systems 10, 20 of FIGS. 1A, 1B.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of controller 114 with respect to the HMD 112. In other examples, HMD 112 may take the form of other wearable head mounted displays, such as glasses or goggles.

As further shown in FIG. 2, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, still cameras, IR scanners, UV scanners, laser scanners, Doppler radar scanners, depth scanners, or the like, configured to output image data representative of the physical environment. In some aspects, the image capture devices 138 can capture image data from a visible spectrum and an invisible spectrum of the electromagnetic spectrum (e.g., IR light). The image capture devices 138 may include one or more image capture devices that capture image data from the visible spectrum and one or more separate image capture devices that capture image data from the invisible spectrum, or these may be combined in the same one or more image capture devices. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Controller 114 can be a hand-held controller for use in interacting with an artificial reality system 10, 20. Controller 114 can include one or more emitters 208 that emit light in the visible or non-visible spectrum. In some example implementations, the controller 114 can include ten or more emitters 208. In some aspects, emitters 208 can be IR emitters. Emitters 208 can be arranged in a pattern (also referred to as a "constellation") that can be used by artificial reality system 10, 20 to determine a pose of the controller 114. Controller 114 can include user interface features such as buttons, dials etc. that can provide input for use by artificial reality system 10, 20.

In one example, in accordance with the techniques described herein, control unit 210 is configured to, based on the sensed image data, determine a pose for a controller 114. When within the field of view of the image capture devices 138, the artificial reality system can detect a pattern of the emitters 208 of controller 14 within the image data and use the pattern to determine a pose of the controller 114. When the controller 114 is not trackable within the field of view of the image capture devices 138 or occluded within the fields of view 130A, 130B, the artificial reality system can use measurements obtained from the controller 114 along with motion models specific to particular cases to determine the pose of the controller 114, as further described below. For example, the controller 114 may be determined to be not trackable within the image data if fewer than three emitters of the controller 114 are detectable in the image data. The control unit 210 can render virtual objects and other artificial reality content based on the determination of the estimated pose of the controller 114.

Figure 3:
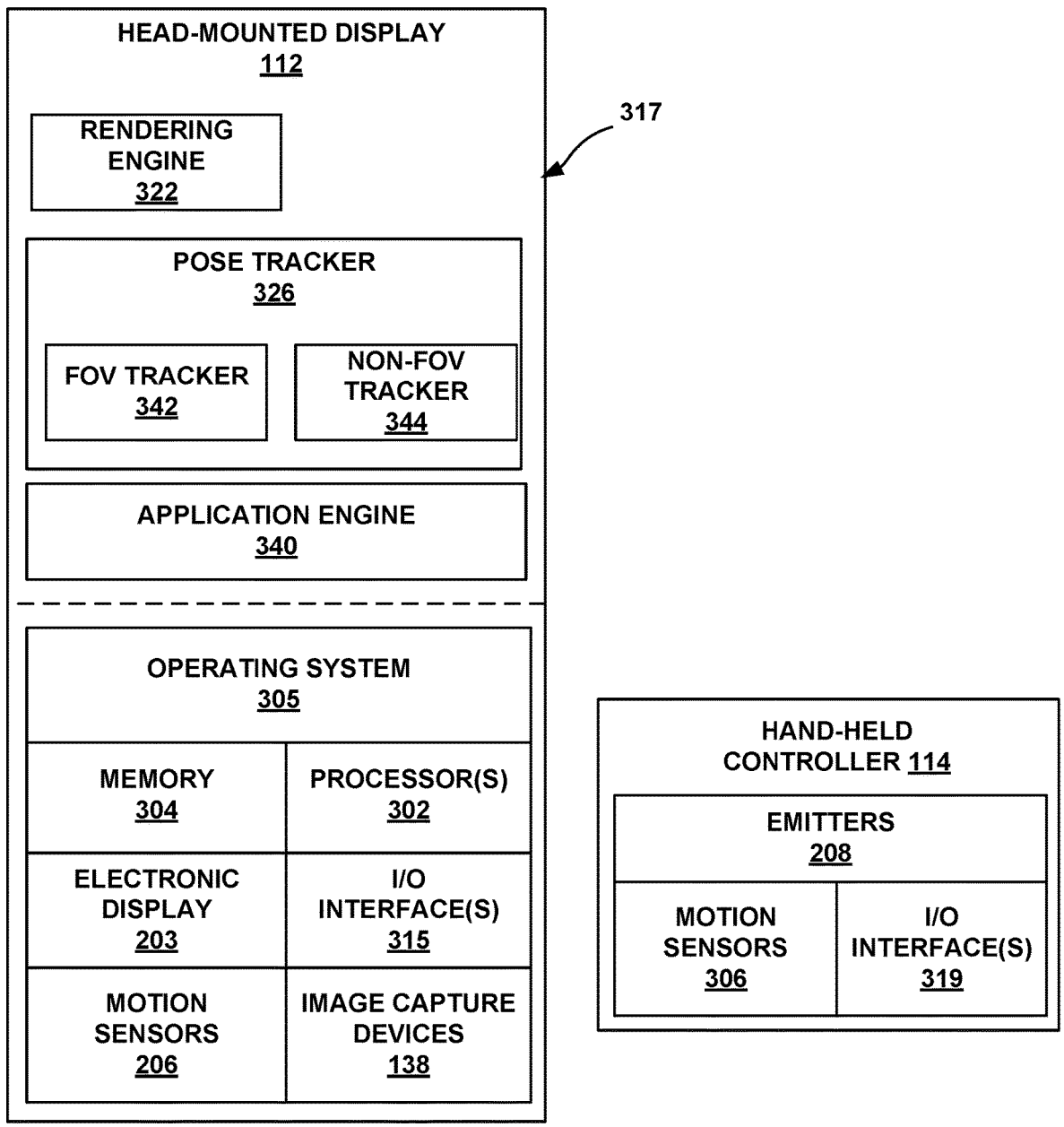
FIG. 3 is a block diagram depicting an example in which pose tracking for a hand-held controller is performed by an example instance of the HMD of the artificial reality systems of FIGS. 1A, 1B in accordance with the techniques of the disclosure.

FIG. 3 is a block diagram showing an example in which pose tracking for a hand-held controller is performed by an example instance of artificial reality system 10, 20 of FIGS. 1A, 1B. In the example of FIG. 3, HMD 112 performs pose tracking and rendering for HMD 112 and controllers 114 in accordance with the techniques described herein based on sensed data, such as motion data and image data received from HMD 112 and/or controllers 114.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with controller 114 via similar I/O interfaces 319 and other devices such as a keyboard, game controllers, display devices, image capture devices, other HMDs, and the like. Moreover, the one or more I/O interfaces 315, 319 may include one or more wired or wireless network interface controllers (NICs) for communicating with a network, such as network 104. Additionally, processor(s) 302 are coupled to electronic display 203, motion sensors 206, and image capture devices 138. In some examples, processors 302 and memory 304 may be separate, discrete components. In other examples, memory 304 may be on-chip memory collocated with processors 302 within a single integrated circuit.

Software applications 317 of HMD 112 operate to provide an overall artificial reality application. In this example, software applications 317 include application engine 340, rendering engine 322, and pose tracker 326.

In general, application engine 340 includes functionality to provide and present an artificial reality application, e.g., a teleconference application, a gaming application, a navigation application, an educational application, training or simulation applications, and the like. Application engine 340 may include, for example, one or more software packages, software libraries, hardware drivers, and/or Application Programming Interfaces (APIs) for implementing an artificial reality application on HMD 112. Responsive to control by application engine 340, rendering engine 322 generates 3D artificial reality content for display to the user by application engine 340 of HMD 112.

Application engine 340 and rendering engine 322 construct the artificial content for display to user 110 in accordance with current pose information for controller 114 and HMD 112 within a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112 and controller measurement data received from controller 114, such as movement information and user commands, and, in some examples, data from any external sensors 90 (FIGS. 1A, 1B), such as external cameras, to capture 3D information within the real world environment, such as motion by user 110, position and location of controller 114, and/or feature tracking information with respect to user 110. Based on the sensed data, pose tracker 326 determines a current pose for the HMD 112 and controller 114 within the frame of reference of HMD 112 and, in accordance with the current poses, constructs the artificial reality content for display to user 110.

Pose tracker 326 includes an FOV tracker 342 and a non-FOV tracker 344. FOV tracker 342 operates on image data obtained via image capture devices 138 and controller 114 measurement data to determine image-based controller state data that can be used to compute an estimated pose for the controller 114 when the controller 114 is trackable with the field of view of image capture devices 138. A controller 114 can be considered trackable within the field of view when the controller 114 is within the field of view, is not occluded by other objects, and is not at rest.

Non-FOV tracker 342 operates on measurements obtained from the controller 114 and HMD 112 to determine a pose for controller 114 when the controller 114 is not trackable within the field of view of image capture devices 138 and the measurements and other available data meet activation conditions for particular cases of controller 114 and/or HMD 112 positioning.

Further details on the operation of pose tracker 326, FOV tracker 342 and non-FOV tracker 344 are provided below with respect to FIGS. 5-11.

Controller 114 can be a hand-held controller that provides for user interaction with artificial reality system 10, 20. In some aspects, controller 114 includes emitters 208, motion sensors 306, and I/O interface 319. Emitters 208 can emit and/or reflect light within the visible or non-visible spectrum. For example, emitters 208 can emit light in the IR spectrum.

Motion sensors 206, can include sensors such as one or more accelerometers (also referred to as inertial measurement units or "IMUs") that output data indicative of current acceleration of controller 114, GPS sensors that output data indicative of a location of controller 114, radar or sonar that output data indicative of distances of controller 114 from various objects, or other sensors that provide indications of a location or orientation of controller 114 or other objects within a physical environment.

Figure 4:
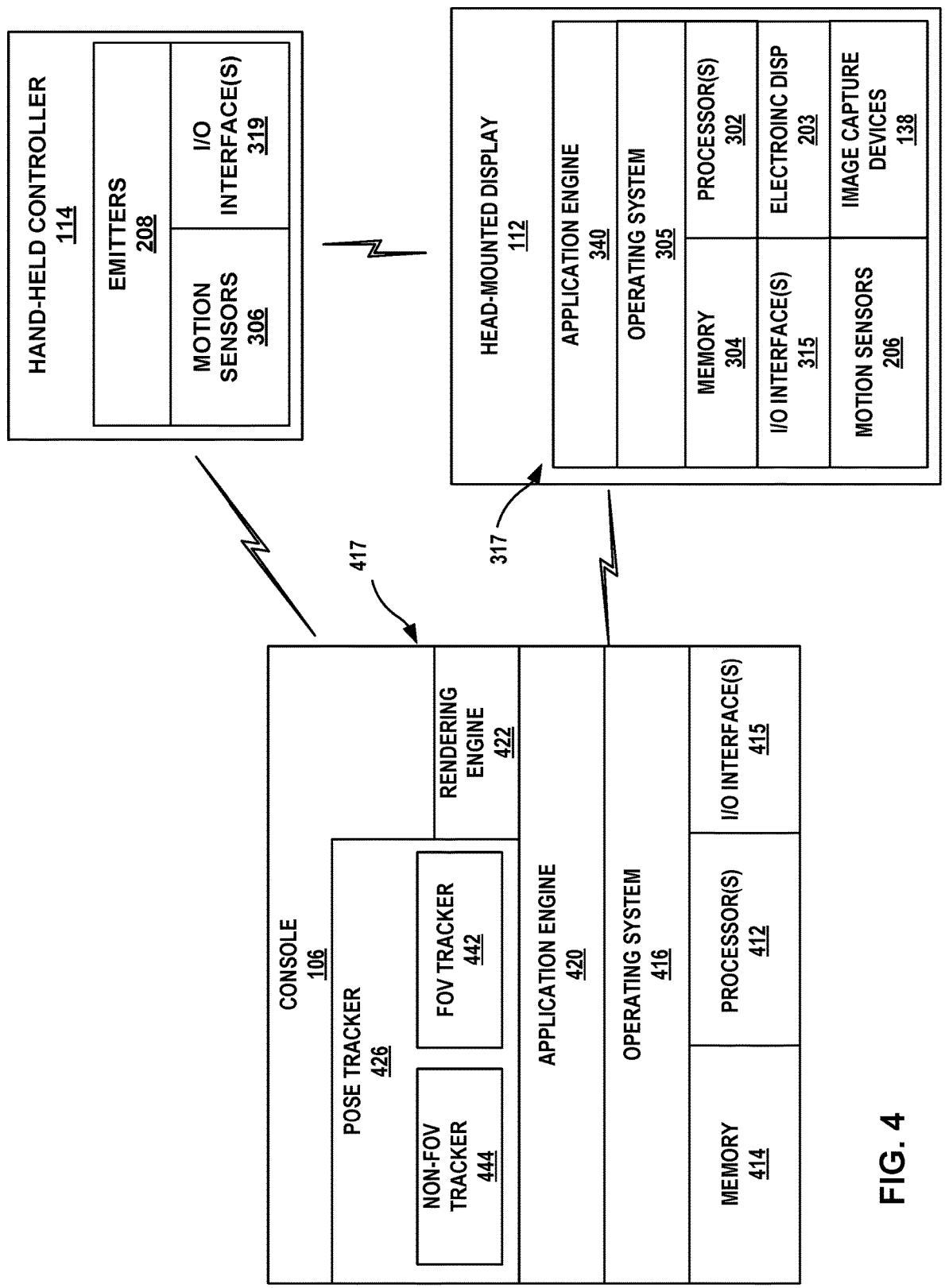
FIG. 4 is a block diagram showing example implementations in which pose tracking for a hand-held controller is performed by example instances of the console and the HMD of the artificial reality systems of FIGS. 1A, 1B.

FIG. 4 is a block diagram showing example implementations in which pose tracking for a hand-held controller is performed by example instances of console 106 and HMD 112 of artificial reality system 10, 20 of FIGS. 1A, 1B. In the example of FIG. 4, console 106 performs pose tracking and rendering for HMD 112 in accordance with the techniques described herein based on sensed data, such as motion data received from a HMD 112 and/or controller 114, and image data received from HMD 112 and/or external sensors.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, and image capture devices 138.

In general, console 106 is a computing device that processes image and tracking information received from cameras 102 (FIG. 1B) and/or HMD 112, and measurement data from controller 114 to perform pose tracking, and content rendering for HMD 112 and controller 114. In some examples, console 106 is a single computing device, such as a workstation, a desktop computer, a laptop, or gaming system. In some examples, at least a portion of console 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as a keyboard, game controllers, display devices, image capture devices, HMDs, and the like. Moreover, the one or more I/O interfaces 415 may include one or more wired or wireless network interface controllers (NICs) for communicating with a network, such as network 104. Each of processors 302, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of console 106 operate to provide an overall artificial reality application. In this example, software applications 417 include application engine 420, rendering engine 422, and pose tracker 426.

In general, application engine 420 includes functionality to provide and present an artificial reality application, e.g., a teleconference application, a gaming application, a navigation application, an educational application, training or simulation applications, and the like. Application engine 420 may include, for example, one or more software packages, software libraries, hardware drivers, and/or Application Program Interfaces (APIs) for implementing an artificial reality application on console 106. Responsive to control by application engine 420, rendering engine 422 generates 3D artificial reality content for display to the user by application engine 340 of HMD 112.

Application engine 420 and rendering engine 422 construct the artificial content for display to user 110 in accordance with current pose information for HMD 112 and controller 114 within a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112 and controller 114, such as image data from sensors on HMD 112, motion sensor data from controller 114, and, in some examples, data from any external sensors 90 (FIGS. 1A, 1B), such as external cameras, to capture 3D information within the real world environment, such as motion by user 110, motion of controller 114, and/or feature tracking information with respect to user 110. Based on the sensed data, pose tracker 426 determines a current pose for the HMD 112 and the controller 114 within the frame of reference of HMD 112 and, in accordance with the current poses, constructs the artificial reality content for communication, via the one or more I/O interfaces 315, 415, to HMD 112 for display to user 110.

Similar to pose tracker 326 described above with respect to FIG. 3, pose tracker 426 includes an FOV tracker 442 and a non-FOV tracker 444. FOV tracker 442 operates on image data obtained via image capture devices 138 or external cameras 102 to determine image-based controller state data for the controller 114 when the controller 114 is trackable with the field of view of image capture devices 138, 102. A controller 114 can be considered trackable within the field of view when the controller 114 is within the field of view, is not occluded by other objects, and is not at rest.

Non-FOV tracker 442 operates on measurements obtained from the controller 114 and HMD 112 to determine model-based controller state data for controller 114 when the controller 114 is not trackable within the field of view of image capture devices 138, 102 and the measurements and other available date meet activation conditions for particular cases of controller 114 and/or HMD 112 positioning.

Further details on the operation of pose tracker 426, FOV tracker 442 and non-FOV tracker 444 are provided below with respect to FIGS. 5-11.

Figure 5:
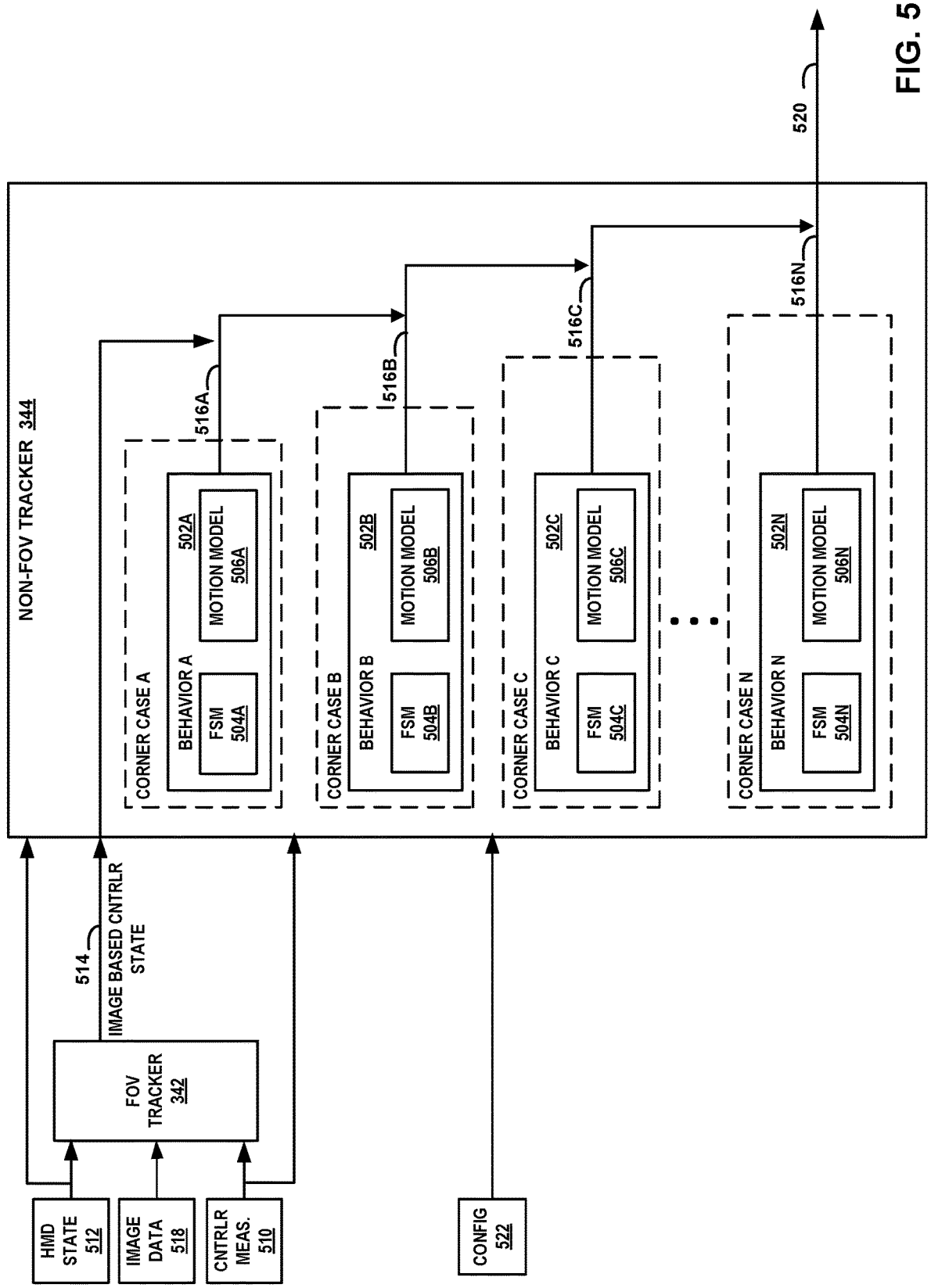
FIG. 5 is a block diagram showing components of an example non-FOV tracker in accordance with aspects of the disclosure.

FIG. 5 is a block diagram showing components of an example non-FOV tracker 344 (and 444) in accordance with aspects of the disclosure. In some aspects, non-FOV tracker 344 includes a plurality of behaviors 502A-N (referred to generically as a behavior 502) that correspond to operations performed by the non-FOV tracker 344 in response to determining that the controller 114 is not trackable within the field of view of a camera 138 and that available data indicates that the state of controller 114 may meet one or more activation conditions associated with tracking corner cases. Examples of such corner cases include the controller 114 being at rest; the position of the controller is unreliable, out of the field of view and in proximity to the HMD; in the field of view but occluded by another object and attached to the other object; in the field of view but occluded by another object and not attached to the other object. In some aspects, the occluding object can be a second hand-held controller. Other corner cases are possible and within the scope of the inventive subject matter.

The non-FOV tracker 344 can receive as input controller measurements 510 obtained from controller 114. The controller measurements 510 can include values from motion sensors 206 in controller 114. For example, the controller measurements can include linear and angular acceleration, linear and angular velocity, and other motion related data received from controller 114 or derived from data received from controller 114. Input controller measurements 510 may also include non-image-based controller measurements generated by HMD 112, such as distance measurements obtained using radar tracking or near-field communication distance tracking.

Additionally, non-FOV tracker 344 can receive HMD state data 512 obtained from HMD 112. The HMD state data can include the current pose of HMD 112, and can be used to determine a location relationship between HMD 112 and controller 114.

Each behavior 502 can have one or more activation conditions and one or more deactivation conditions associated with the behavior 502. The activation conditions can include rules, logic, heuristics, and/or parameter values that can be applied to the controller measurements 510 and HMD state 512 to determine if a tracking corner case associated with a behavior currently exists. If the activation conditions are satisfied, a motion model 506 associated with the satisfied activation conditions for behavior 502 and a motion model 506 associated with the activation conditions are activated.

Conversely, the one or more deactivation conditions associated with a behavior 502 can include rules, logic, heuristics and/or parameter values that can be applied to the controller measurements 510 and HMD state 512 to determine if the corner case associated with a behavior no longer exists. If the deactivation conditions associated with a behavior 502 are satisfied, the behavior 502 and a motion model 506 associated with the behavior 502 are deactivated.

In some aspects, once a behavior and its associated motion models have been activated in response to the activation conditions being satisfied, the behavior and associated motion model remain in an activated state until the deactivation conditions for the behavior and associated motion model have been satisfied. In other aspects, the deactivation conditions can be optional and a behavior and its associated motion model are activated for as long as the activation conditions remain satisfied, and deactivated when the activation conditions are no longer satisfied.

Further, the non-FOV tracker 344 can receive image-based controller state data 514 from FOV tracker 342. The image-based controller state data 514 can be output data produced by FOV tracker 342 as a result of attempting to determine a pose for controller 114 using HMD state data 512, controller measurement data 510, and image data 518 from image capture devices 138.

Each behavior 502 can have an associated motion model 506. The motion model 506 for a behavior defines how model-based controller state data 516A-N (collectively, "model-based controller state data 516") for the controller 114 is determined. For example, the motion model 506 for a behavior 502 can utilize controller measurement data 510, HMD state data 512, and controller state data 514 to determine model-based controller state data 516.

Each behavior 502 can have an associated finite state machine (FSM) 504. The FSM 504 associated with a behavior 502 can keep track of state information (activated, deactivated, etc.), transitions from one state to another and other state information associated with a behavior. The FSM 504 for a behavior can preserve state information between display frames and can be used by the motion model 506 associated with the behavior 502 to determine model-based controller state data 516.

In some aspects, the behaviors 502A-N are associated with a priority. The priority for the behaviors can be determined in various ways. For example, priority can be determined based on likelihood of occurrence of the corner case, devastation of user experience should the corner case occur, number of times the corner case is reported as a problem etc.

In some implementations, the behaviors 502A-N can be organized in a subsumption architecture. In a subsumption architecture, the behaviors 502A-N for the corner cases are organized in respective layers that prioritize each behavior. In the example illustrated in FIG. 5, the bottom layer, behavior 502N, is the highest priority behavior. Behavior 502A at the top layer is the lowest priority behavior. Candidate versions of the model-based controller state data 516 can be determined by motion models 506 associated with each activated behavior. Candidate model-based controller state data 516 determined according to motion models 506 of higher (lower-priority) layers can be ignored, blocked or replaced by the candidate model-based controller state data 516 determined by a lower (higher-priority) layer behavior 502 in the subsumption architecture.

In some implementations, the activated behaviors 502 can be evaluated in parallel with one another. Each activated behavior 502 can determine a candidate version of the model-based controller state data 516 based on its associated motion model 506 and input controller measurement data 510, HMD state data 512, and image-based controller state data 514. The candidate version of the model-based controller state data 516 determined by the motion model 506 in the layer having the highest priority among the activated behaviors 502 can be used as the final version of the controller state data 520 output by non-FOV tracker 344.

If no behaviors are activated, the non-FOV tracker 344 acts as a pass-through, and the image-based controller state data 514 determined by the FOV tracker 342 and provided to non-FOV tracker 344 as input is used as the output controller state data 520 of non-FOV tracker 344.

As will be appreciated from the above, the controller state data 520 will be determined based on the motion model 506 associated with the highest-priority activated behavior. If no behaviors are activated, the controller state data 520 will be based on the image-based controller state data 514. The controller state data 520 output by the non-FOV tracker 344 can be used by pose tracker 326 to determine a controller pose for controller 114.

In some cases, a motion model 506 for a behavior 502 may utilize information other than that available from controller measurement data 510, HMD state data 512, and controller state data 514. Configuration data 522 can store and provide such data. For example, as described below, some motion models may use an average length of an arm or average position of a torso with respect to a head in order to determine position data for model-based controller state data 516. The average length of an arm or average position of a torso with respect to a head can be stored in configuration data 516 for used by a motion model 506.

Figure 6:
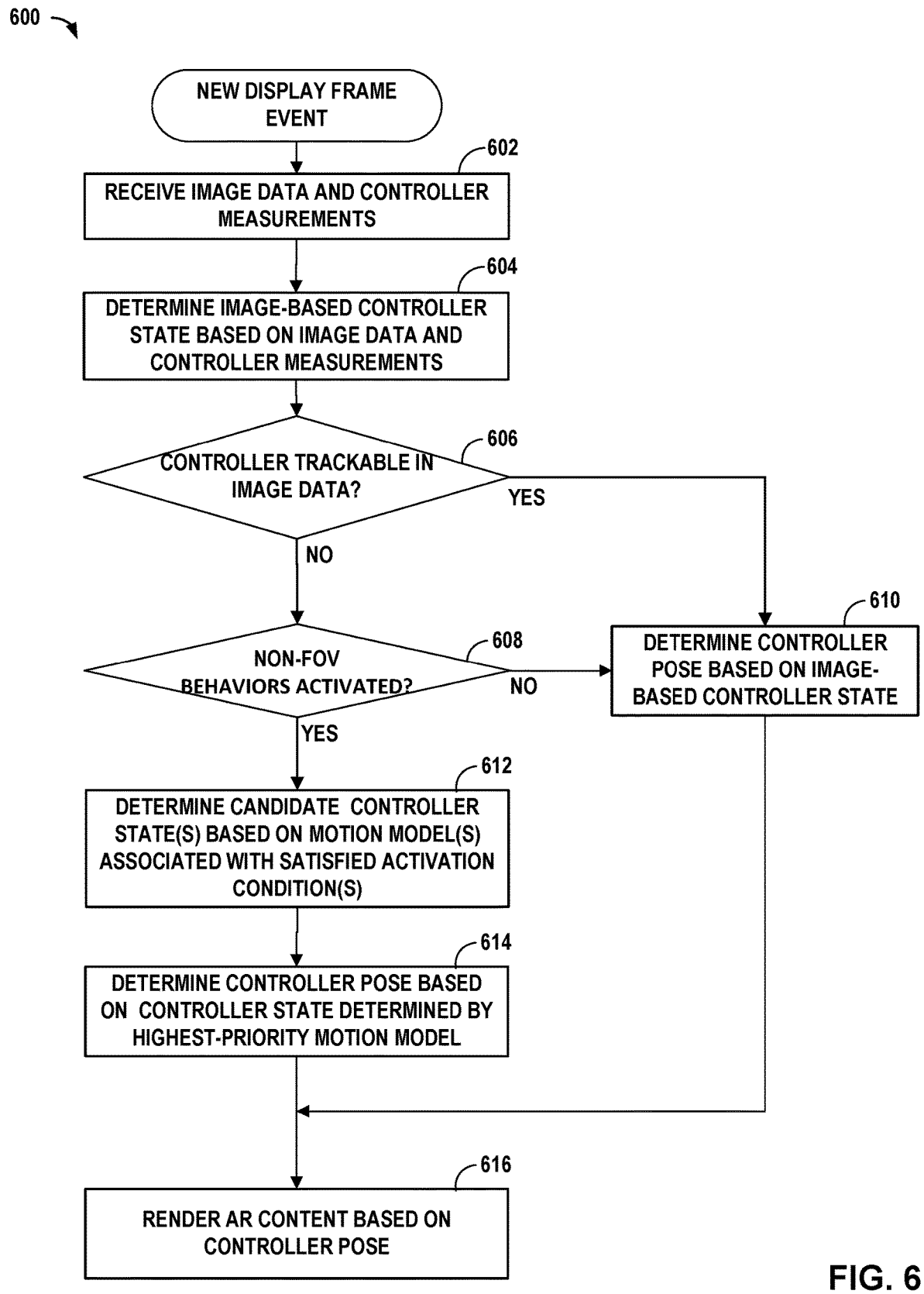
FIG. 6 is a flowchart illustrating example operations of a method for determining a controller pose for a hand-held controller that is not trackable, in some cases, in a field of view in accordance with aspects of the disclosure.

FIG. 6 is a flowchart 600 illustrating example operations of a method for determining a controller pose for a handheld controller that is not trackable, in some cases, in a field of view in accordance with aspects of the disclosure. The example operations described in flowchart 600 can be performed periodically or in response to an event. For example, the example operations can be performed as part of a response to a display frame generation event where the event causes an artificial reality system to render a display frame for presentation on HMD 112.

An FOV tracker can receive image data from one or more image capture devices 138 of an HMD 112 and controller measurement data from a controller 114 (602). Additionally, the image data can include image data provided by cameras or sensors external to the HMD 112. The FOV tracker can determine image-based controller state data using the image data and the controller measurement data (604).

The FOV tracker can determine if the controller 114 is trackable within the image data (606). In some aspects, the FOV tracker can determine that the controller 114 is trackable within the image data if at least three emitters 208 of controller 114 are detectable with the image data and the controller measurement data indicates the controller is not at rest. In some aspects, the FOV tracker can use sensor fusion to determine if the controller 114 is trackable within the image data.

If the FOV tracker determines that the controller 114 is trackable within the image data (YES branch of 606), the controller pose can be determined based on the image-based controller state data as determined by the FOV tracker (610). If the FOV tracker determines that the controller 114 is not trackable within the image data (NO branch of 606), the non-FOV tracker determines if any non-FOV behaviors have been activated, or if non-FOV activation conditions have been satisfied for a behavior (608). The non-FOV tracker can determine if any behavior activation conditions have been satisfied based on the controller measurement data, the HMD state data, and/or the image-based controller state data. If no activation conditions have been satisfied and no behaviors are currently activated (NO branch of 608), then the controller pose can be determined based on the image-based controller state data as determined by the FOV tracker (610).

If at least one behavior has been activated or at least one activation condition has been satisfied (YES branch of 608), the non-FOV tracker can determine candidate model-based controller state data by evaluating the motion models associated with each behavior that is activated (612). The motion models can access the input controller measurement data, HMD state data, and image-based controller state values as needed to determine the candidate model-based controller state data associated with a behavior. The controller pose can then be determined based on the candidate model-based controller state data produced by the motion model associated with the highest priority behavior (614).

The pose tracker can determine the controller pose based on the image-based controller state data determined by the FOV tracker if the controller is trackable in the image data or if no motion models are activated. The pose tracker can determine the controller pose based on the model-based controller state data determined by the non-FOV tracker if the controller is not trackable in the image data (to determine a controller pose) and a motion model has been activated. The rendering engine can render artificial reality content based on the determined controller pose and HMD pose (616).

FIGS. 7-10 are flowcharts illustrating operations of example methods for activating behaviors and evaluating motion models associated with the activated behaviors in accordance with aspects of the disclosure.

Figure 7:
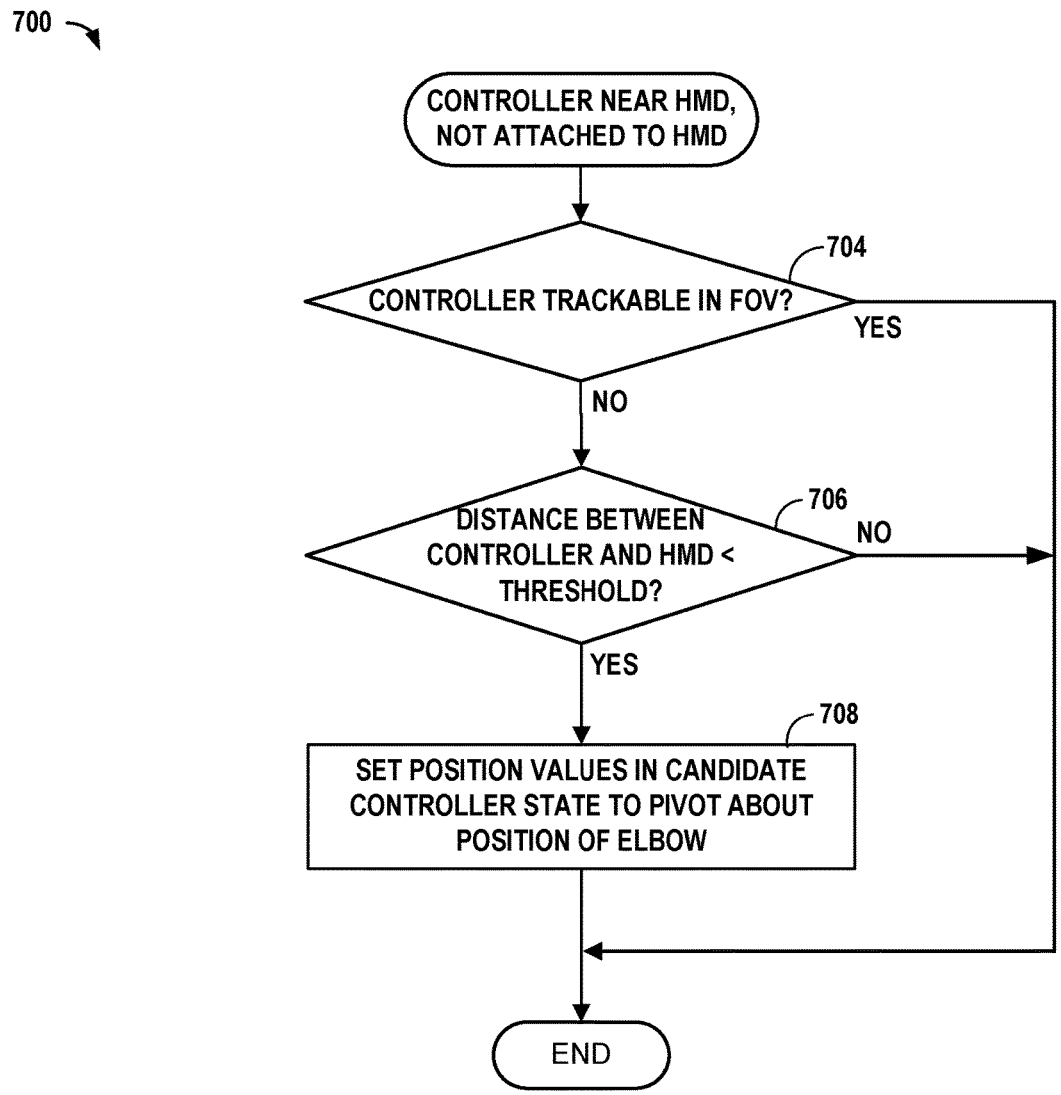
FIGS. 7-10 are flowcharts illustrating example operations of methods for activating behaviors and evaluating motion models associated with the activated behaviors in accordance with aspects of the disclosure.

FIG. 7 is a flowchart illustrating example operations of a method for determining a controller pose in the corner case that the controller is near the HMD, but not attached to the HMD. An activation condition for this case includes determining that the controller is not trackable in the field of view of image capture devices of an AR system (NO branch of 704). As discussed above, in some aspects, the controller is not trackable in the field of view if the controller is not located in the field of view of any cameras or sensors, if the controller is occluded within the field of view by another object, if the position of the controller is unreliable, or if the controller is at rest. A further activation condition for the corner case of FIG. 7 is that the distance between the controller and the HMD is less than a predefined or configurable threshold (NO branch of 706). If both activation conditions are met, the behavior and motion model associated with the corner case are activated. If the controller is trackable within the field of view of image capture devices of AR system (YES branch of 704) or the distance between the HMD and the controller is greater than the configurable threshold (YES branch of 706), then the activation conditions for this corner case are not satisfied and the method ends.

The motion model associated with the corner case behavior sets position values in the candidate model-based controller state data for the behavior to cause a virtual hand or other object associated with controller to pivot about a position of a virtual elbow (708). The position of the virtual elbow in the virtual world space can be determined based a pre-defined or configurable forearm length stored in the configuration data and the last known controller position and headset position. The motion model in this case can be referred to as a "controller-on-a-stick" model, where the stick is a virtual arm representing the user's arm, the virtual elbow is at one end of the stick and a virtual hand associated with the position of the controller is at the other end of the stick.

In some aspects, deactivation conditions for the corner case can include reacquiring tracking on the controller when the controller becomes trackable within the field of view.

Figure 12A:
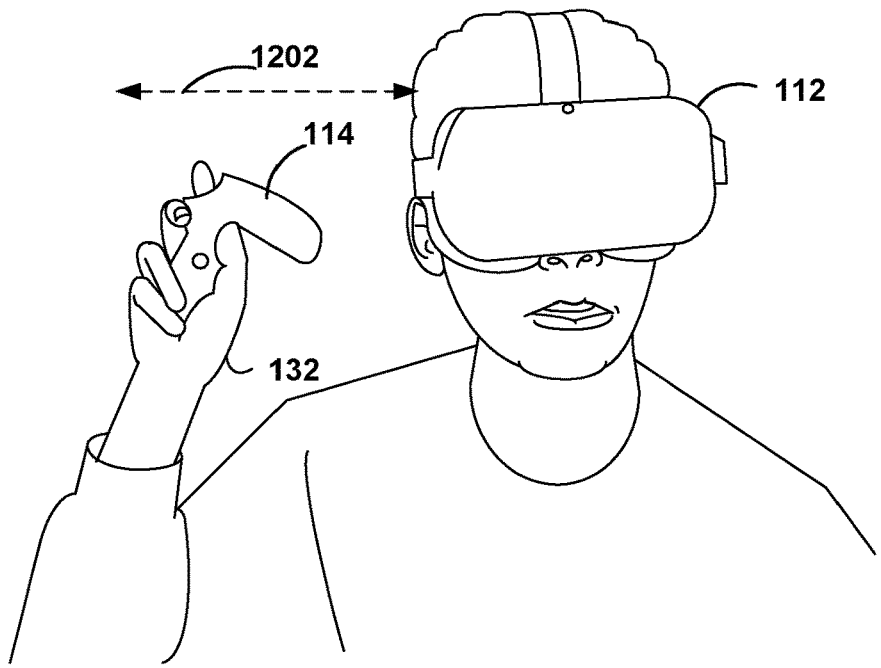
FIGS. 12A-12B, 13A-13B, 14A-14B, and 15A-15B illustrate example physical environments and example artificial reality content based on the example physical environments.
Figure 12B:
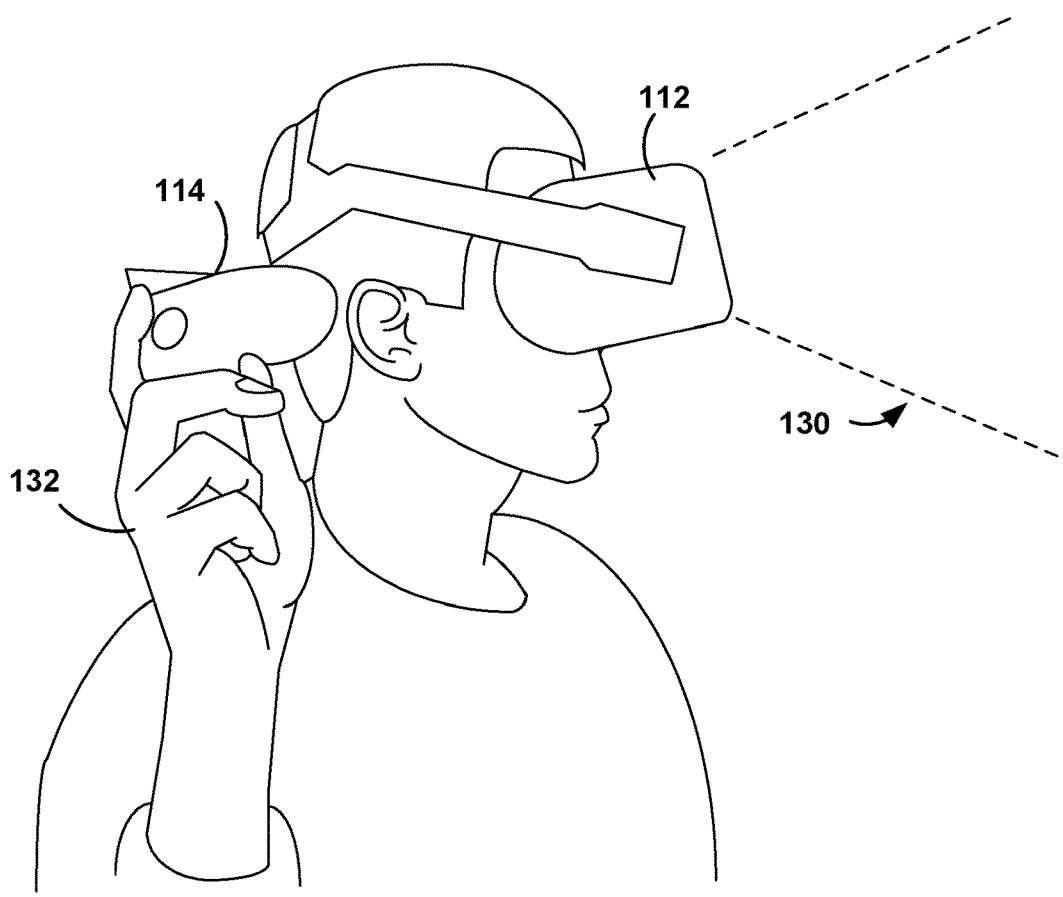

FIGS. 12A and 12B illustrate an example physical environment for the corner case described above with reference to FIG. 7. FIG. 12A is a front view of a user wearing an HMD 112 and holding a controller 114 in hand 132 within threshold distance 1202 of HMD 112. FIG. 12B is a side view of the user. As can be seen in FIG. 12B, the controller 114 is not within the field of view 130 of cameras on HMD 112. In this example, the user may be waving their arm to greet or attract the attention of another user in the same virtual environment. A virtual hand and arm may be rendered so as to appear to wave based on the motion model. The waving motion can be rendered by having the virtual hand pivot about the elbow.

Figure 8:
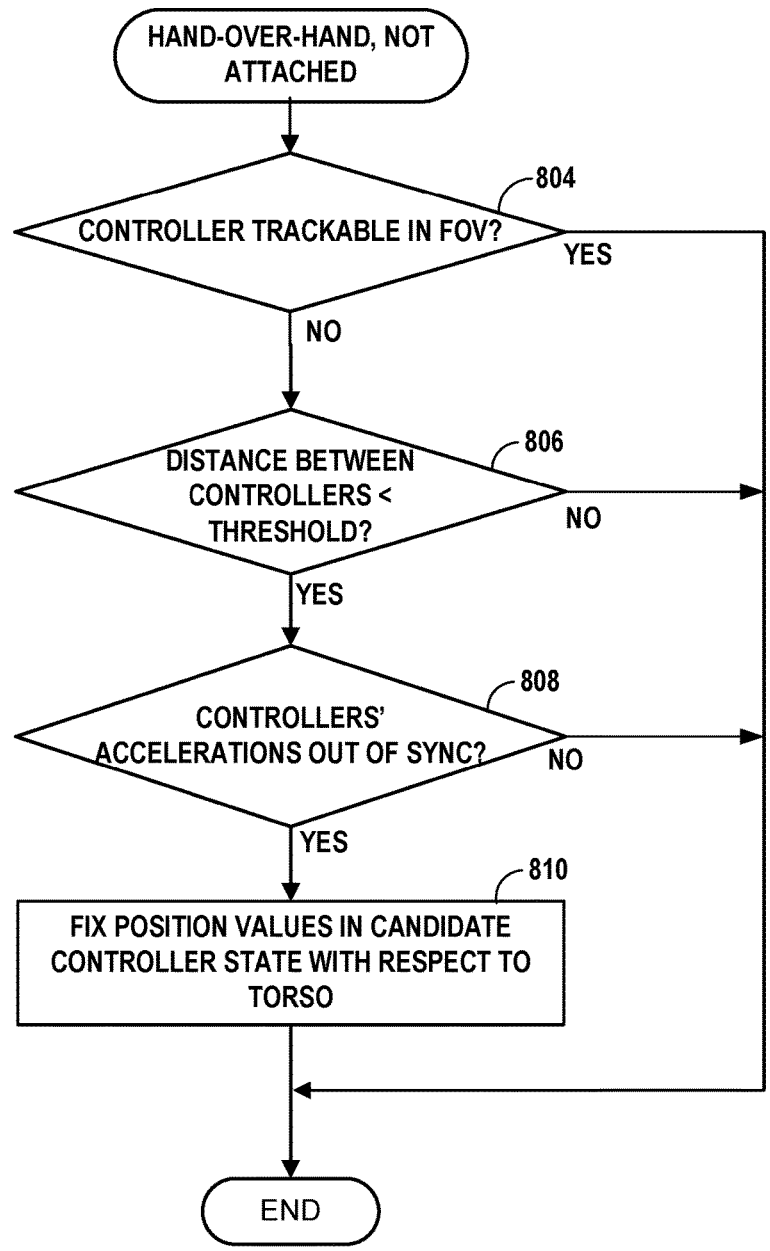

FIG. 8 is a flowchart illustrating example operations of a method for determining a controller pose in the corner case that a first controller is within the field of view, but obstructed by a second controller, and the first controller is not "attached" to the second controller. An activation condition for this case includes determining that the first controller not within the field of view (NO branch of 804). A further activation condition for the corner case is that the distance between the first controller and the second controller is less than a predefined or configurable threshold (YES branch of 806). A still further activation condition is that the first controller's acceleration values (as determined from controller measurement data) are not in synchronization with the second controller's acceleration values (YES branch of 808). If all of the above activation conditions are met, the motion model and behavior associated with the corner case is activated. If the controller is trackable within the field of view of image capture devices of AR system (YES branch of 804), the distance between the first and second controller is greater than the configurable threshold (NO branch of 806), or the first controller's acceleration values are in synchronization with the second controller's acceleration values (NO branch of 808), then the activation conditions for this corner case are not satisfied and the method ends.

The motion model associated with the corner case behavior fixes position values in the candidate model-based controller state data for the first controller to a position of a virtual torso of the user (810). The position of the virtual torso can be determined based on configuration data that provides an average distance between a torso and an HMD, HMD poses, and controller orientation.

In some aspects, deactivation conditions for the corner case can include the visible (second) controller leaving the camera or sensor field of view, or the obstructed (first) controller becoming trackable within the field of view.

Figure 13A:
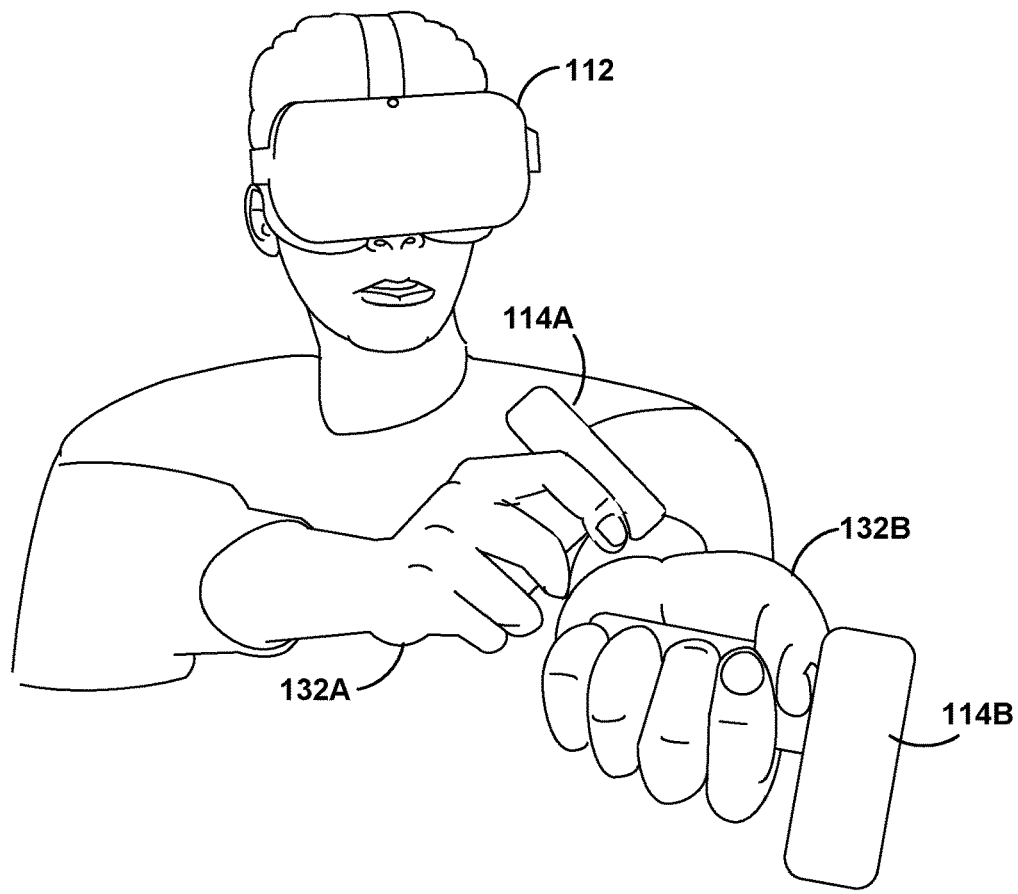
Figure 13B:
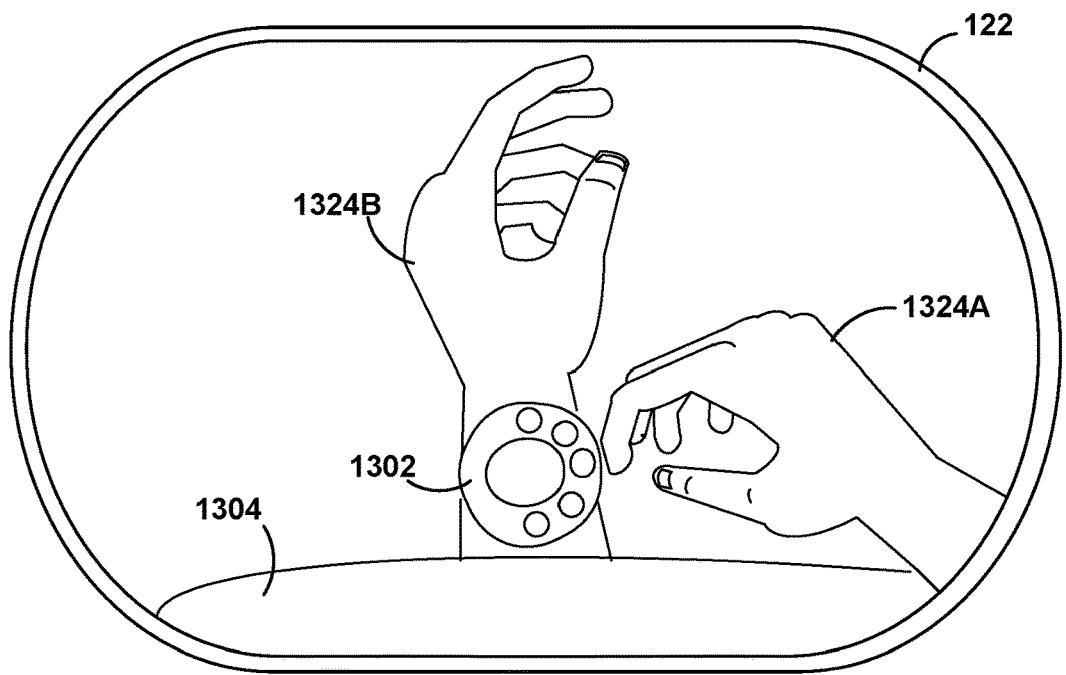

FIGS. 13A and 13B illustrate an example physical environment and example artificial reality content for the corner case described above with reference to FIG. 8. FIG. 13A is a front view of a user wearing an HMD 112 and holding a controller 114A in hand 132A and a controller 114B in hand 132B. Controller 114B is occluded by the hand 132A and/or controller 114A. In this example, the user may be interacting with a menu on a virtual wrist watch 1302. As the user moves his or her hands to manipulate the menu, the first and second controllers 114A and 114B experience different acceleration values and are thus not attached to one another.

FIG. 13B illustrates example artificial reality content 122 for the example illustrated in FIG. 13A. The motion model for this corner case behavior causes the virtual hand 1324B to be rendered at a fixed distance from a virtual torso 1304 when controller 114B is occluded and not moving in synchronization with controller 114A.

Figure 9:
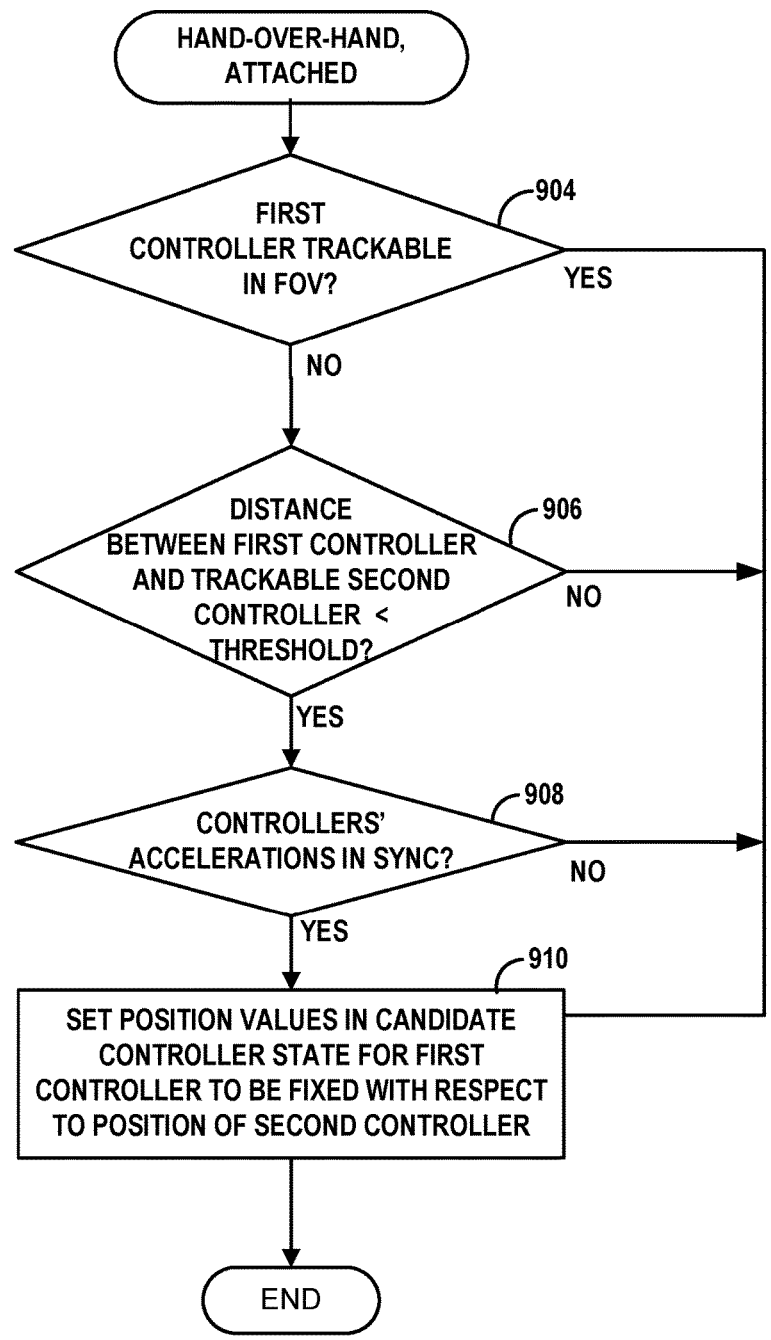

FIG. 9 is a flowchart illustrating example operations of a method for determining a controller pose in the tracking corner case that a first controller is within the field of view, but obstructed by a second controller and is attached to the second controller. An activation condition for this case includes determining that the first controller is not trackable in the field of view (NO branch of 904). A further activation condition for the corner case is that the distance between the first controller and the second controller is less than a predefined or configurable threshold (YES branch of 906). A still further activation condition is that the first controller's acceleration values (as determined from controller measurement data) are in synchronization with the second controller's acceleration values (YES branch of 908). If all of the above activation conditions are met, the motion model and behavior for the corner case are activated. If the controller is trackable within the field of view of image capture devices of AR system (YES branch of 904), the distance between the first and second controller is greater than the configurable threshold (NO branch of 906), or the first controller's acceleration values are not in synchronization with the second controller's acceleration values (NO branch of 908), then the activation conditions for this corner case are not satisfied and the method ends.

The motion model associated with the corner case behavior sets the position values in the candidate model-based controller state data for the first controller to a fixed position with respect to the position of the second controller (910).

In some aspects, deactivation conditions for the corner case can include the visible (second) controller leaving the camera or sensor field of view, or the obstructed (first) controller becoming trackable within the field of view, or the first and second controllers' acceleration values are no longer in synchronization.

Figure 14A:
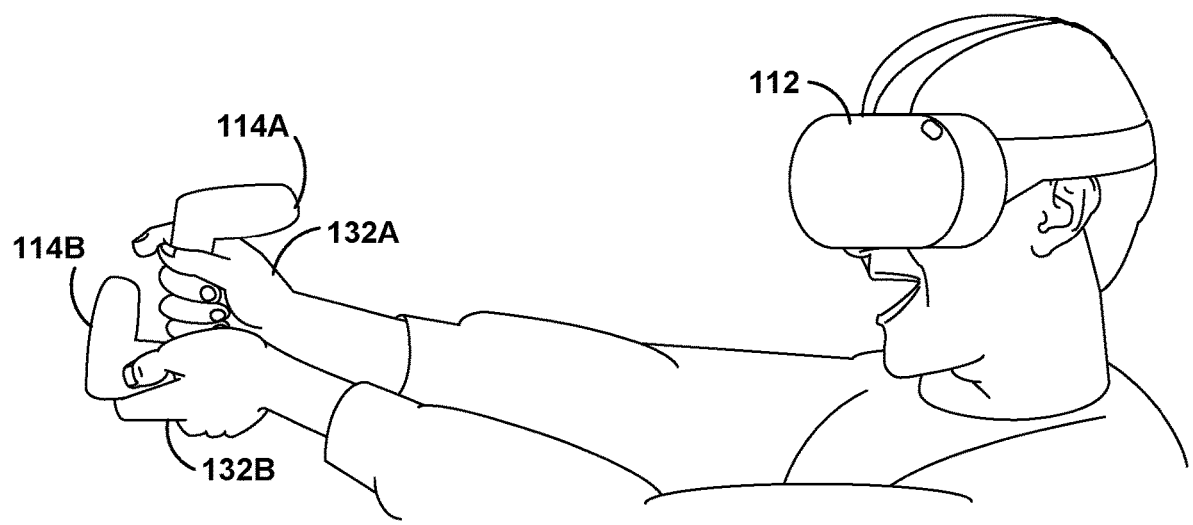
Figure 14B:
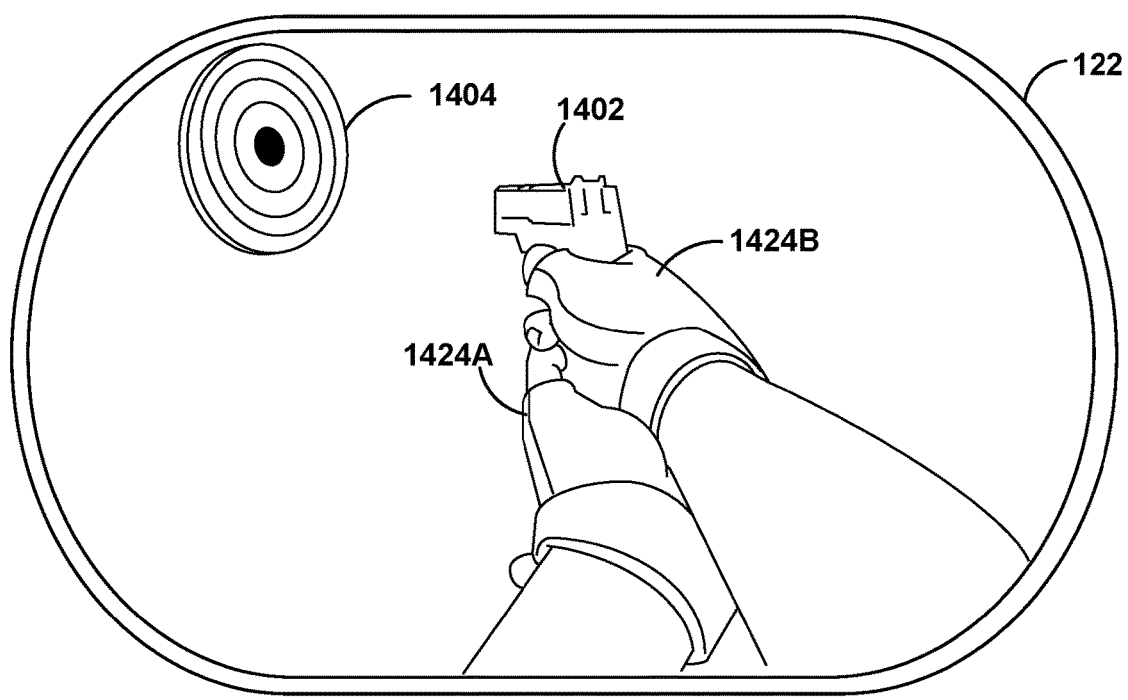

FIGS. 14A and 14B illustrate an example physical environment and example artificial reality content for the corner case described above with reference to FIG. 9. FIG. 14A is a side view of a user wearing an HMD 112 and holding a controller 114A in hand 132A and a controller 114B in hand 132B. Controller 114B may be occluded by the hand 132A and/or controller 114A. The artificial reality content may comprise a shooting game where a user shoots a virtual gun at a target using a two handed grip. As the user moves his or her hands to aim, the first and second controllers 114A and 114B generate substantially the same acceleration values because the user's hands are both gripping the same object (i.e., the gun) and are thus determined to be attached to one another.

FIG. 14B illustrates example artificial reality content 122 for the example illustrated in FIG. 14A. In this example, the user has aimed a virtual gun 1402 at a virtual target 1404. The motion model for this corner case behavior causes the virtual hand 1424A to be rendered at a fixed position with respect to the position of virtual hand 1424B.

Figure 10:
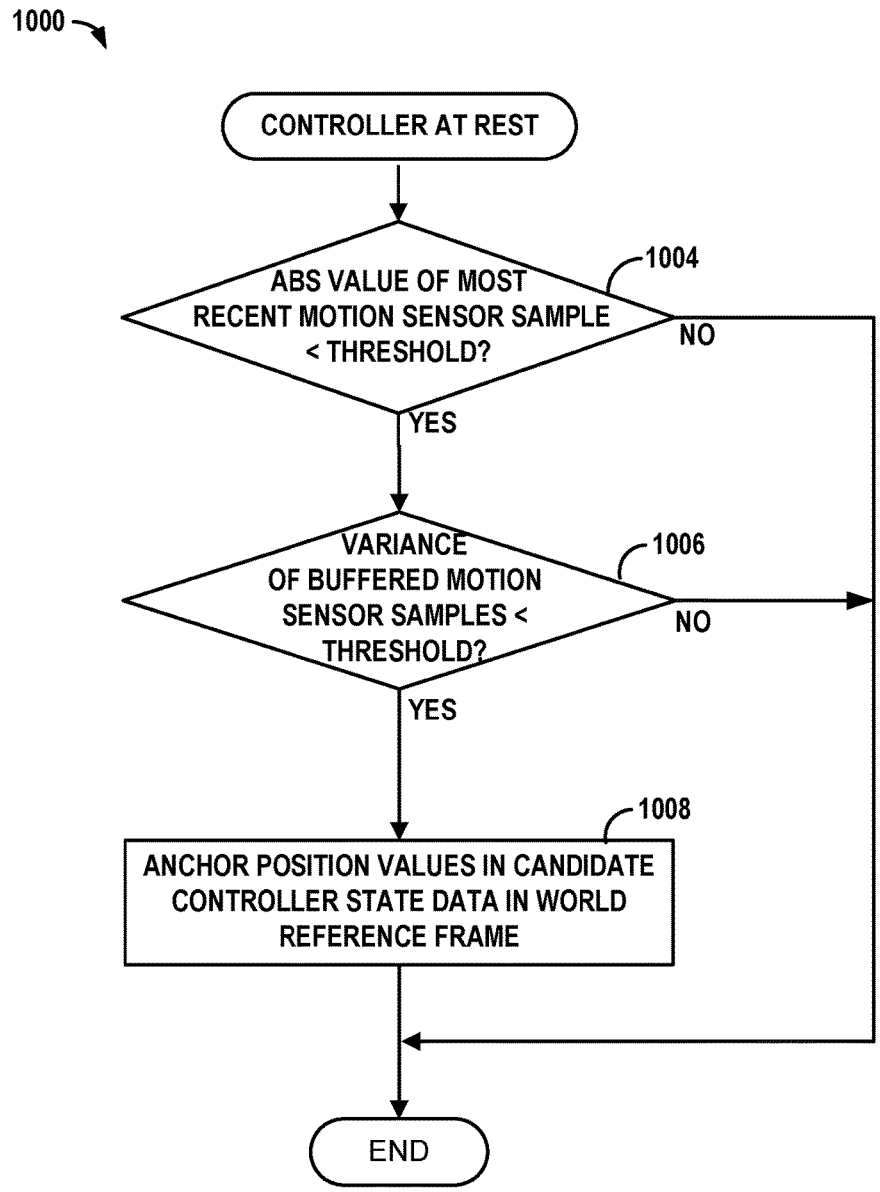

FIG. 10 is a flowchart illustrating example operations of a method for determining a controller pose in the corner case that a position of the controller is unreliable or at rest in the field of view. A controller's position may become unreliable if the controller is positioned too far from the cameras to allow determination of the position with reasonable confidence. Additionally, a controller's position may become unreliable if the controller is at rest (e.g., placed on a tabletop or other stationary position). In this case, noise from the motion sensor devices may cause the controller to appear to move when it in fact should be stationary. In either case, a user might see jitter (position of virtual object associated with the controller oscillates near the actual location) or fly-away-then-snap (virtual object associated with the controller flies away, then quickly jumps to the actual location). An activation condition for this case includes determining that the absolute values of a most recent set of acceleration values from a motion sensor of the controller are less than a predefined or configurable threshold (YES branch of 1004). A further activation condition for the corner case is that the variance of a buffered set of motion sensor values is less than a predefined or configurable threshold (YES branch of 1006). If both of the above activation conditions are met, the motion model and behavior for the "controller at rest" corner case are activated. If the most recent set of acceleration values from a motion sensor of the controller are greater than a predefined or configurable threshold (NO branch of 1004) or the variance of the buffered set of motion sensor values is greater than a predefined or configurable threshold (NO branch of 1006), then the activation conditions for this corner case are not satisfied and the method ends.

The motion model associated with the corner case behavior anchors position values in the candidate model-based controller state data for the controller to a fixed position in a world reference frame (1008).

In some aspects, deactivation conditions for the corner case can include the variance of buffered motion sensor samples exceeding a predetermined or configurable threshold, or the absolute value of most-recent motion sensor value sample exceeding a predetermined or configurable threshold.

Figure 11:
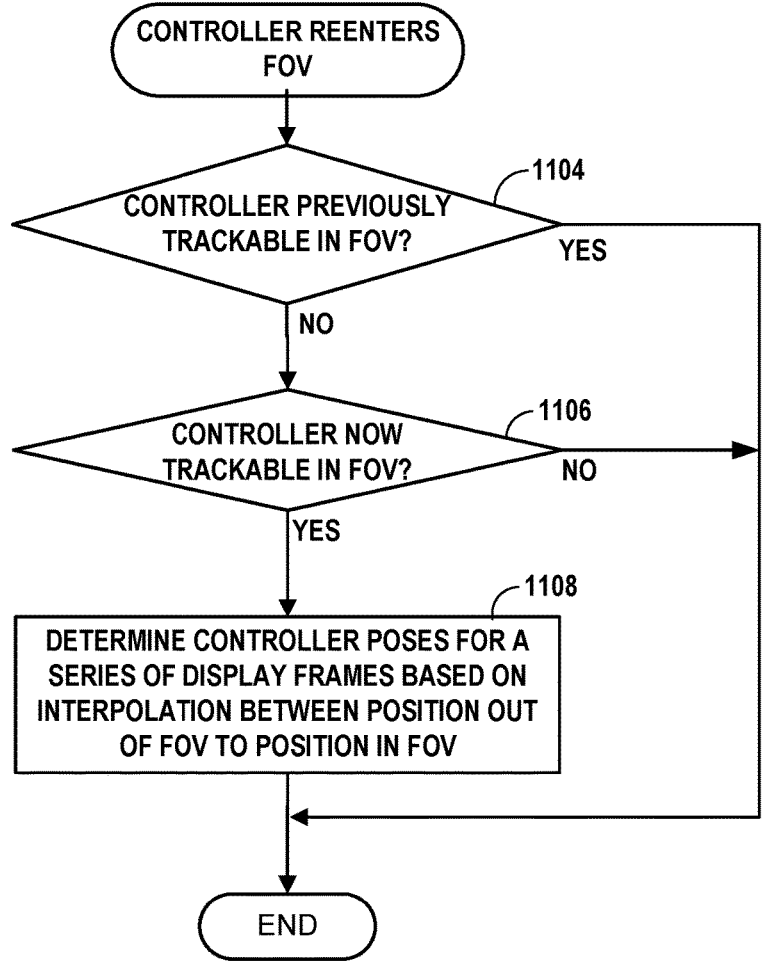
FIG. 11 is a flowchart illustrating example operations of a method for reducing jitter when a hand-held controller reenters a field of view in accordance with aspects of the disclosure.

FIG. 11 is a flowchart illustrating example operations of a method for reducing jitter when a hand-held controller reenters a field of view in accordance with aspects of the disclosure. A pose tracker can determine whether a controller was trackable within a field of view during the previous display frame (1104). If the controller was trackable during the previous display frame (YES branch of 1104), the controller has not reentered the field of view. Jitter reduction operations are therefore not necessary, and the method ends.

If the controller was not trackable during the previous display frame (NO branch of 1104), the pose tracker can determine whether the controller is trackable in the field of view for the current display frame (1106). If the controller was not trackable in the previous frame and the controller is not trackable in the current display frame, jitter reduction is not necessary, and the method ends (NO branch of 1106). If the controller was not trackable in the previous display frame and is trackable in the current display frame, the controller has reentered the field of view (YES branch of 1106). The pose tracker can determine controller poses for a series of display frames using interpolation to prevent a virtual object whose position is determined with respect to the controller from appearing to "jump" position (1108). In particular, the pose tracker can determine controller poses by interpolating between a position of the controller determined by the non-FOV tracker when the controller was outside of the field of view and a position of the controller determined by the FOV tracker when the controller reenters the field of view.

Figure 15A:
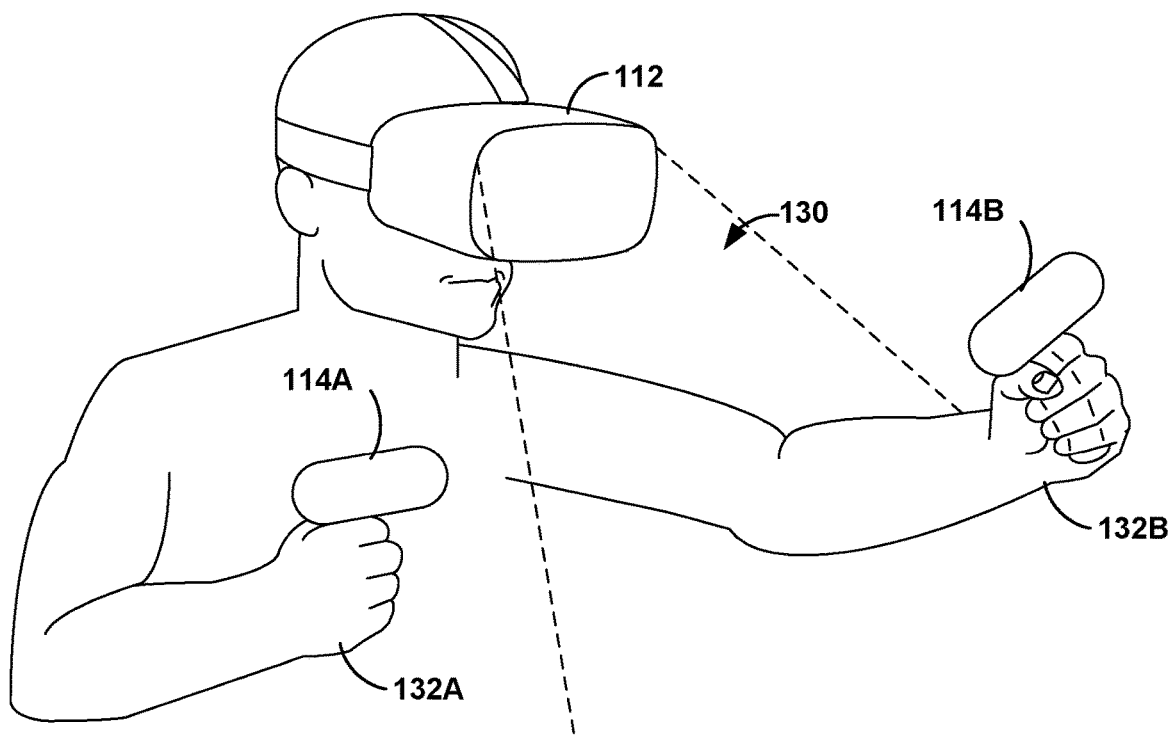
Figure 15B:
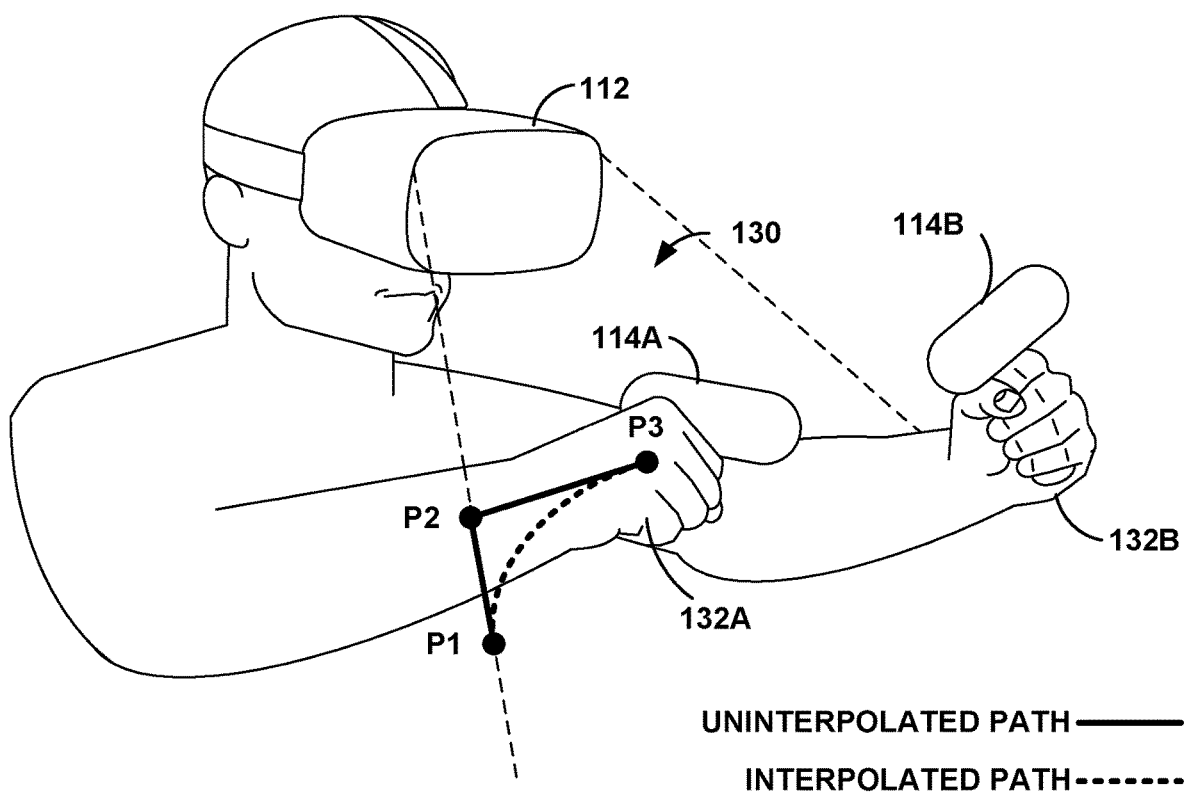

FIGS. 15A and 15B illustrate an example of the interpolation performed by the method of FIG. 11. FIG. 15A illustrates an initial state of a physical environment where a first controller 114A is not in the field of view 130 of cameras or sensors of HMD 112. As an example, the user of HMD 112 may be participating in a virtual boxing game provided on the artificial reality system.

FIG. 15B illustrates a subsequent state of the physical environment where the first controller 114A has reentered the field of view 130 of HMD 112. For example, the user may perform a "punch" with the hand holding controller 114. In the example illustrated in FIG. 15B, the non-FOV tracker has determined the position of the controller 114A at P1 and the FOV tracker determines the position of the controller 114A at P2. Without interpolation, the path of a virtual hand representing hand 132A may appear to jump from P1 to P2 before proceeding to P3 in subsequent display frames. Using the method described above in FIG. 11, the pose tracker can interpolate a path between P1 and P3 that smoothes the transition of the virtual hand from out of the field of view 130 to within the field of view 130 over a series of display frames. In the example illustrated in FIG. 15B, the uninterpolated path is represented by a solid line connecting points P1, P2 and P3. The interpolated path is represented by a dashed line connecting P1 and P3. The interpolation speed and duration can be determined based on a measurement or estimation of activity within the artificial reality content.

The description above of various aspects of the disclosure has been presented in the context of an artificial reality system. The techniques described herein can be implemented as well in other types of systems that use image or other sensor data to determine positions of objects that may move in and out of a field of view of a camera or sensor.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
   an image capture device configured to capture image data representative of a physical environment;
   a head mounted display (HMD) configured to output artificial reality content;
   a pose tracker executable by one or more processors and configured to determine, based at least in part on controller state data, a controller pose representing a position and orientation of a hand-held controller, the pose tracker including a non-FOV tracker having a plurality of motion models associated with different motion behaviors for the hand-held controller, each of the plurality of motion models associated with one or more respective activation conditions, wherein the non-FOV tracker is configured to concurrently evaluate two or more motion models of the plurality of motion models and determine the controller state data based, at least in part, on the evaluated motion model of the two or more motion models of the plurality of motion models having a highest priority in response to a determination that the hand-held controller is not trackable within the image data and that the two or more motion models of the plurality of motion models are activated; and
   a rendering engine configured to render for display at the HMD the artificial reality content and at least one graphical object in accordance with the controller pose.

2. The artificial reality system of claim 1, wherein the plurality of motion models are configured in a subsumption architecture.

3. The artificial reality system of claim 1,
   wherein the pose tracker further comprises an FOV tracker configured to determine image-based controller state data based, at least in part, on the image data;
   wherein the image-based controller state data is provided as input to the non-FOV tracker; and
   wherein the non-FOV tracker determines the controller state data based on the image-based controller state data in response to a determination that none of the plurality of motion models are activated.

4. The artificial reality system of claim 1, wherein the non-FOV tracker is further configured to activate a motion model of the plurality of motion models in response to determining that the one or more respective activation conditions associated with the motion model are satisfied based, at least in part, on controller measurement data indicative of a motion behavior for the hand-held controller.

5. The artificial reality system of claim 1, wherein the determination that the hand-held controller is not trackable within the image data comprises:
   a determination that a number of emitters of the hand-held controller detectable in the image data is less than a predetermined or configurable threshold, or a determination that the position of the hand-held controller is unreliable.

6. The artificial reality system of claim 1, wherein the one or more respective activation conditions comprise an indication that the hand-held controller is not within a field of view of the image capture device and a determination that the hand-held controller is in motion within a threshold distance of the HMD; and
    wherein the one of the plurality of motion models associated with the one or more respective activation conditions is configured to determine the controller state data in accordance with a pivot of a first position associated with the hand-held controller about a second position associated with a virtual elbow.

7. The artificial reality system of claim 1, further comprising a second hand-held controller;
    wherein the hand-held controller is obstructed within a field of view of the image capture device by the second hand-held controller;
    wherein the one or more respective activation conditions of a motion model of the plurality of motion models comprise a determination that a distance between the hand-held controller and the second hand-held controller is below a threshold value and an acceleration of the hand-held controller is out of synchronization with an acceleration of the second hand-held controller; and
    wherein the motion model is configured to determine one or more position values of the controller state data as a fixed position with respect to a position of a virtual torso.

8. The artificial reality system of claim 1, further comprising a second hand-held controller;
    wherein the hand-held controller is obstructed within a field of view of the image capture device by the second hand-held controller;
    wherein the one or more respective activation conditions of a motion model of the plurality of motion models comprise a determination that a distance between the hand-held controller and the second hand-held controller is below a threshold value and an acceleration of the hand-held controller is substantially synchronized with an acceleration of the second hand-held controller; and
    wherein the motion model is configured to determine one or more position values of the controller state data in a fixed position with respect to a second position of the second hand-held controller.

9. The artificial reality system of claim 1,
    wherein the hand-held controller further comprises an inertial measurement unit (IMU);
    wherein the one or more respective activation conditions of a motion model of the plurality of motion models comprise a determination that a most-recent absolute value provided by the IMU is below a first threshold value and a variance in a plurality of buffered values provided by the IMU is below a second threshold value; and
    wherein the motion model is configured to determine one or more position values of the controller state data to be in a fixed position with respect to a world reference frame.

10. The artificial reality system of claim 1, wherein the pose tracker is configured to determine from the image data and the controller state data for the hand-held controller that the hand-held controller has reentered a field of view of the image capture device; and
    wherein the pose tracker is configured to interpolate, over a plurality of display frames, the controller pose based on first controller pose determined while the hand-held controller was out of the field of view and second controller state data determined after the hand-held controller reentered the field of view.

11. The artificial reality system of claim 1, wherein the image capture device is integrated with the HMD.

12. The artificial reality system of claim 1, wherein the image data comprises infra-red image data.

13. A method comprising:
    obtaining, by an image capture device of an artificial reality system including a head mounted display (HMD), image data representative of a physical environment;
    determining that two or more motion models of a plurality of motion models are activated based on controller measurement data for a hand-held controller satisfying one or more activation conditions associated with each corresponding motion model of the plurality of motion models;
    concurrently evaluating the two or more activated motion models;
    determining, by a non-FOV tracker of the artificial reality system, controller state data for the hand-held controller in accordance with a motion model of the two or more activated motion models having a highest priority, wherein the determining the controller state data in accordance with the motion model is in response to determining that the hand-held controller is not trackable within the image data;
    determining, by the artificial reality system, a controller pose representing a position and orientation of the hand-held controller based, at least in part, on the controller state data; and
    rendering, by the artificial reality system for display at the HMD, artificial reality content and at least one graphical object in accordance with the controller pose.

14. The method of claim 13, wherein the plurality of motion models are configured in a subsumption architecture.

15. The method of claim 13, further comprising:
    determining, by an FOV tracker of the artificial reality system, image-based controller state data for the hand-held controller based, at least in part, on the image data;
    providing the image-based controller state data as input to the non-FOV tracker;
    wherein the non-FOV tracker determines the controller state data based, at least in part, on the image-based controller state data in response to determining that none of the plurality of motion models are activated.

16. The method of claim 13, wherein the determining that the controller measurement data indicative of the motion behavior for the hand-held controller satisfies the one or more activation conditions associated with the motion model comprises determining that the hand-held controller is not trackable within the image capture data and that the hand-held controller is in motion within a threshold distance of the HMD,
    the method further comprising evaluating the motion model associated with the one or more respective activation conditions, wherein the motion model is configured to determine the controller state data in accordance with a pivot of a first position of the hand-held controller about a second position of a virtual elbow.

17. The method of claim 13, wherein the hand-held controller is obstructed within a field of view of the image capture device by a second hand-held controller;

wherein the determining that the controller measurement data indicative of the motion behavior for the hand-held controller satisfies the one or more activation conditions associated with the motion model comprises determining that a distance between the hand-held controller and the second hand-held controller is below a threshold value and determining that an acceleration of the hand-held controller is out of synchronization with an acceleration of the second hand-held controller, the method further comprising evaluating the motion model associated with the one or more respective activation conditions, wherein the motion model is configured to determine one or more position values of the controller state data as a fixed position with respect to a position of a virtual torso.

18. The method of claim 13, wherein the hand-held controller is obstructed within a field of view of the image capture device by a second hand-held controller, wherein determining that the controller measurement data indicative of the motion behavior for the hand-held controller satisfies the one or more activation conditions associated with the motion model comprises determining that a distance between the hand-held controller and the second hand-held controller is below a threshold value and an acceleration of the hand-held controller is synchronized with an acceleration of the second hand-held controller, the method further comprising evaluating the motion model associated with the one or more respective activation conditions, wherein the motion model is configured to determine one or more position values of the controller state data in a fixed position with respect to a second position of the second hand-held controller.

19. The method of claim 13, wherein determining that the controller measurement data indicative of the motion behavior for the hand-held controller satisfies the one or more activation conditions associated with the motion model comprises determining that a most-recent absolute value provided by an inertial measurement unit (IMU) of the hand-held controller is below a first threshold value and a variance in a plurality of buffered values provided by the IMU is below a second threshold value, and the method further comprising evaluating the motion model associated with the one or more respective activation conditions, wherein the motion model is configured to determine one or more position values of the controller state data in a fixed position in a world reference frame.

20. A non-transitory, computer-readable medium comprising instructions that, when executed, cause one or more processors of an artificial reality system including a head mounted display (HMD) to:

obtain image data representative of a physical environment via an image capture device;

determine that two or more motion models of a plurality of motion models are activated based on controller measurement data for a hand-held controller satisfying one or more activation conditions associated with each corresponding motion model of the plurality of motion models;

concurrently evaluate the two or more activated motion models;

determine the controller state data for the hand-held controller in accordance with a motion model of the two or more activated motion models having a highest priority, wherein the determination of the controller state data in accordance with the motion model is in response to a determination that the hand-held controller is not trackable within the image data;

determine a controller pose representing a position and orientation of the hand-held controller based, at least in part, on the controller state data; and render for display at the HMD, artificial reality content and at least one graphical object in accordance with the controller pose.

* * * * *